US012666513B2

(12) United States Patent
Archer et al.

(10) Patent No.: US 12,666,513 B2
(45) Date of Patent: Jun. 23, 2026

(54) LIGHTING SYSTEM INCLUDING A FAST LOW-POWER STARTUP CIRCUIT

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US); Steven C. Krattiger, Northridge, CA (US); Erik Morales, Los Angeles, CA (US); Vachik Javadian, Glendale, CA (US); Yuko Nakazawa, Santa Cruz, CA (US)

(73) Assignee: ERP POWER, LLC, Westlake Village, CA (US)

( * ) Notice: Subject to any disclaimer, the term of this patent is extended or adjusted under 35 U.S.C. 154(b) by 100 days.

(21) Appl. No.: 18/620,961

(22) Filed: Mar. 28, 2024

(65) Prior Publication Data

US 2024/0334569 A1 Oct. 3, 2024

Related U.S. Application Data

(60) Provisional application No. 63/492,940, filed on Mar. 29, 2023.

(51) Int. Cl.

*H05B 45/375* (2020.01)
*H05B 45/34* (2020.01)
*H05B 45/355* (2020.01)
*H05B 47/16* (2020.01)

(52) U.S. Cl.

CPC ........... *H05B 45/375* (2020.01); *H05B 45/34* (2020.01); *H05B 45/355* (2020.01); *H05B 47/16* (2020.01)

(58) Field of Classification Search

CPC .... H05B 45/375; H05B 45/34; H05B 45/355; H05B 47/16

See application file for complete search history.

(56) References Cited

U.S. PATENT DOCUMENTS

2001/0010638 A1* 8/2001 Konno .................. H02M 3/335 363/21.07
2022/0418060 A1* 12/2022 Mohan ................ H05B 45/325

* cited by examiner

*Primary Examiner* — Daniel D Chang
(74) *Attorney, Agent, or Firm* — Womble Bond Dickinson (US) LLP

(57) ABSTRACT

A lighting system includes a converter configured to receive a rectified input voltage and to generate an output voltage based on a control signal; a primary controller configured to generate the control signal to adjust the output voltage of the converter; and a startup circuit configured to power the primary controller based on the rectified input voltage in response to the output voltage being below a threshold, and to power the primary controller based on the output voltage in response to the output voltage being greater than or equal to the threshold.

14 Claims, 21 Drawing Sheets

LIGHTING SYSTEM INCLUDING A FAST LOW-POWER STARTUP CIRCUIT

CROSS-REFERENCE TO RELATED APPLICATION(S)

This application claims priority to, and the benefit of, U.S. Provisional Application No. 63/492,940 ("INTEGRATED LIGHT ENGINE INCLUDING A FAST, LOW-POWER STARTUP CIRCUIT"), filed on Mar. 29, 2023.

This application is also related to U.S. patent application Ser. No. 18/599,038 ("LIGHTING SYSTEM WITH INTEGRATED POWER SUPPLY AND LIGHT SOURCE"), filed on Mar. 7, 2024, which claims priority to, and the benefit of, U.S. Provisional Application No. 63/488,972 ("LIGHTING SYSTEM WITH INTEGRATED POWER SUPPLY AND LIGHT SOURCES"), filed on Mar. 7, 2023; U.S. Provisional Application No. 63/490,630 ("VERTICALLY-STACKED COMPACT INTEGRATED LIGHT ENGINE"), filed on Mar. 16, 2023; U.S. Provisional Application No. 63/490,638 ("INTEGRATED LIGHT ENGINE HAVING A CONDUCTIVE SUBSTRATE AND IMPROVED NOISE PERFORMANCE"), filed on Mar. 16, 2023; U.S. Provisional Application No. 63/490,640 ("INTEGRATED LIGHT ENGINE HAVING A CONDUCTIVE SUBSTRATE AND IMPROVED HEAT TRANSFER"), filed on Mar. 16, 2023; U.S. Provisional Application No. 63/490,646 ("INTEGRATED LIGHT ENGINE HAVING A PEDESTAL HEATSINK AND IMPROVED HEAT TRANSFER"), filed on Mar. 16, 2023; U.S. Provisional Application No. 63/490,650 ("INTEGRATED LIGHT ENGINE HAVING A PEDESTAL HEATSINK AND IMPROVED NOISE PERFORMANCE"), filed on Mar. 16, 2023; U.S. Provisional Application No. 63/490,740 ("INTEGRATED LIGHT ENGINE WITH IMPROVED TRIAC LOADING AND WIDE INPUT VOLTAGE RANGE"), filed on Mar. 16, 2023; U.S. Provisional Application No. 63/492,940 ("INTEGRATED LIGHT ENGINE INCLUDING A FAST, LOW-POWER STARTUP CIRCUIT"), filed on Mar. 29, 2023; U.S. Provisional Application No. 63/493,281 ("INTEGRATED LIGHT ENGINE HAVING A LOW-POWER STANDBY MODE"), filed on Mar. 30, 2023; U.S. Provisional Application No. 63/589,948 ("COMPACT LIGHT ENGINE WITH WIDE AC INPUT RANGE AND TUNABLE COLOR AND INTENSITY"), filed on Oct. 12, 2023; and U.S. Provisional Application No. 63/619,264 ("COMPACT LIGHT ENGINE WITH INTEGRATED LED ARRAY"), filed on Jan. 9, 2024, the entire contents of which are incorporated herein by reference.

FIELD

Aspects of the present invention are related to light drivers.

BACKGROUND

A light fixture may include a string of light sources, such as light emitting diodes (LEDs), that convert electrical energy (commonly in the form of electrical current) into light. The light intensity of the light sources is primarily based on the magnitude of the driving current, which is produced by a light driver. The light driver generally includes a PFC controller that is coupled to a diode bridge rectifier at the input of the light driver and ensures that the input current is in phase with the full-wave-rectified line input voltage. The PFC controller may also be used to adjust the switching frequency, duty cycle, on-time, etc., of a DC-DC converter of the light driver. To ensure proper operation of the light driver at startup, it is important to be able to quickly turn on the PFC controller once an AC input signal is available.

In the related art, the output of the rectifier at the input of the light driver may be connected to the power input terminal of PFC (Vin) via a large resistor, which may be 500 KΩ or 1 MΩ, which limits the current flowing into the PFC power input terminal. However, this large resistance, together with the input capacitance at the power input terminal of the PFC controller presents a sizable RC, which slows down startup time. Additionally, this always-present resistor can lead to a significant power loss (e.g., about ⅛ W for a 500 KΩ resistor at a 277 VAC input).

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed to a lighting system including a fast startup circuit that provides a low-power approach for achieving rapid turn on of the primary controller (e.g., PFC controller) and converter, while allowing turn off control using the direct output of the converter, which may prevent intermittent shut-offs of the PFC controller and converter.

According to some embodiments of the present disclosure, there is provided a lighting system including: a converter configured to receive a rectified input voltage and to generate an output voltage based on a control signal; a primary controller configured to generate the control signal to adjust the output voltage of the converter; and a startup circuit configured to power the primary controller based on the rectified input voltage in response to the output voltage being below a threshold, and to power the primary controller based on the output voltage in response to the output voltage being greater than or equal to the threshold.

In some embodiments, the startup circuit includes: a bootstrap circuit configured to generate a first power signal based on the rectified input voltage and the output voltage; an input selector configured to receive the first power signal and a second power signal and to apply one of the first and second power signals to a power input terminal of the primary controller.

In some embodiments, the bootstrap circuit is configured to: receive the rectified input voltage and the output voltage; set the first power signal based on the rectified input voltage in response to the output voltage being below the threshold; and set the first power signal based on the output voltage in response to the output voltage being greater than or equal to the threshold.

In some embodiments, the bootstrap circuit includes: a first transistor including a first gate electrode and configured to selectively electrically couple or decouple an input line and the input selector based on a gate voltage of the first gate electrode, the input line being configured to supply the rectified input voltage; a second transistor including a second gate electrode and configured to selectively electrically couple or decouple the first gate electrode to reference ground based on the output voltage; and a pull-up resistor coupled between the input line and the first gate electrode and configured to activate the first transistor to electrically couple the input line and the input selector in response to the second transistor decoupling the first gate electrode from the reference ground.

In some embodiments, the first transistor is coupled between the input selector and the input line, and is configured to activate to electrically couple the input line to the input selector in response to the first gate electrode being at a first voltage, and to deactivate to electrically decouple the input line from the input selector in response to the first gate electrode being at a second voltage, wherein the second transistor is coupled between the first gate electrode and the reference ground, and the second gate electrode is coupled to an output of the converter, wherein the second transistor is configured to activate in response to the output voltage being greater than or equal to the threshold, and to deactivate in response to the output voltage being less than the threshold, and wherein the pull-up resistor is configured to pull up the first gate electrode to the first voltage to activate the first transistor in response to the second transistor being deactivated.

In some embodiments, the bootstrap circuit further includes: a timer circuit coupled between an output of the converter and the second gate electrode of the second transistor and configured to low-pass filter the output voltage.

In some embodiments, the timer circuit includes an RC filter.

In some embodiments, the bootstrap circuit further includes: a voltage-drop circuit coupled between an output of the converter and the second gate electrode of the second transistor and configured to generate a reduced output voltage based on the output voltage, and to apply the reduced output voltage to the second gate electrode.

In some embodiments, the voltage-drop circuit includes a zener diode having an anode electrode coupled to the second gate electrode of the second transistor, and a cathode electrode coupled to the output of the converter.

In some embodiments, the bootstrap circuit further includes: an isolation circuit coupled between an output of the converter and the second gate electrode of the second transistor and configured to prevent back-charging of the output of the converter from the second gate electrode.

In some embodiments, the isolation circuit includes a diode having an anode electrode coupled to the output of the converter, and a cathode electrode coupled to the second gate electrode of the second transistor.

In some embodiments, the input selector includes: a first diode including an anode terminal configured to receive the first power signal and a cathode terminal coupled to the power input terminal of the primary controller; and a second diode including an anode terminal configured to receive the second power signal and a cathode terminal coupled to the power input terminal of the primary controller.

In some embodiments, the lighting system further includes: a bias regulator coupled between an output of the converter and the primary controller, and configured to generate a second power signal based on the output voltage of the converter to power the primary controller.

In some embodiments, the lighting system further includes: a rectifier configured to receive an AC input signal and to generate the rectified input voltage; and a light source configured to emit light based on the output voltage of the converter.

In some embodiments, the converter is a DC-DC converter, and the primary controller is a power factor correction controller configured to regulate a DC-level current or a DC-level voltage of an output of the converter.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a compact, integrated multi-layered lighting system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to an integrated multi-layered lighting system in a single fixture with wireless capabilities, color temperature mixing, and an integrated light source, which does not sacrifice functionality in favor of space. In some embodiments, this integrated lighting system is multilayered with multiple printed circuit board (PCB) layers that provide additional surface area for mounted components. The resulting lighting system may mimic the color temperature of an ideal black body radiator while being able to fit color channels, a microprocessor, power electronic circuitry, and control circuitry onto a multilayered PCB design that remains compact and is able to fit into existing fixtures. In some examples, the integrated lighting system has a very compact design with a diameter of 61 mm or less and a height of 30 mm or less. The integrated lighting system may operate under a wide input range of about 90 VAC to about 305 VAC at a frequency of about 50-60 Hz. With such input, the integrated lighting system may be capable of delivering up to 5000 lumens at various CCT settings.

According to some embodiments, the compact, multilayer design of the lighting system maximizes the amount of space for installing through-hole components. In some examples, the use of one or more ring PCB boards allows for the color channels to be mounted to the first layer without obstructions from the second or higher layers.

Figure 1:
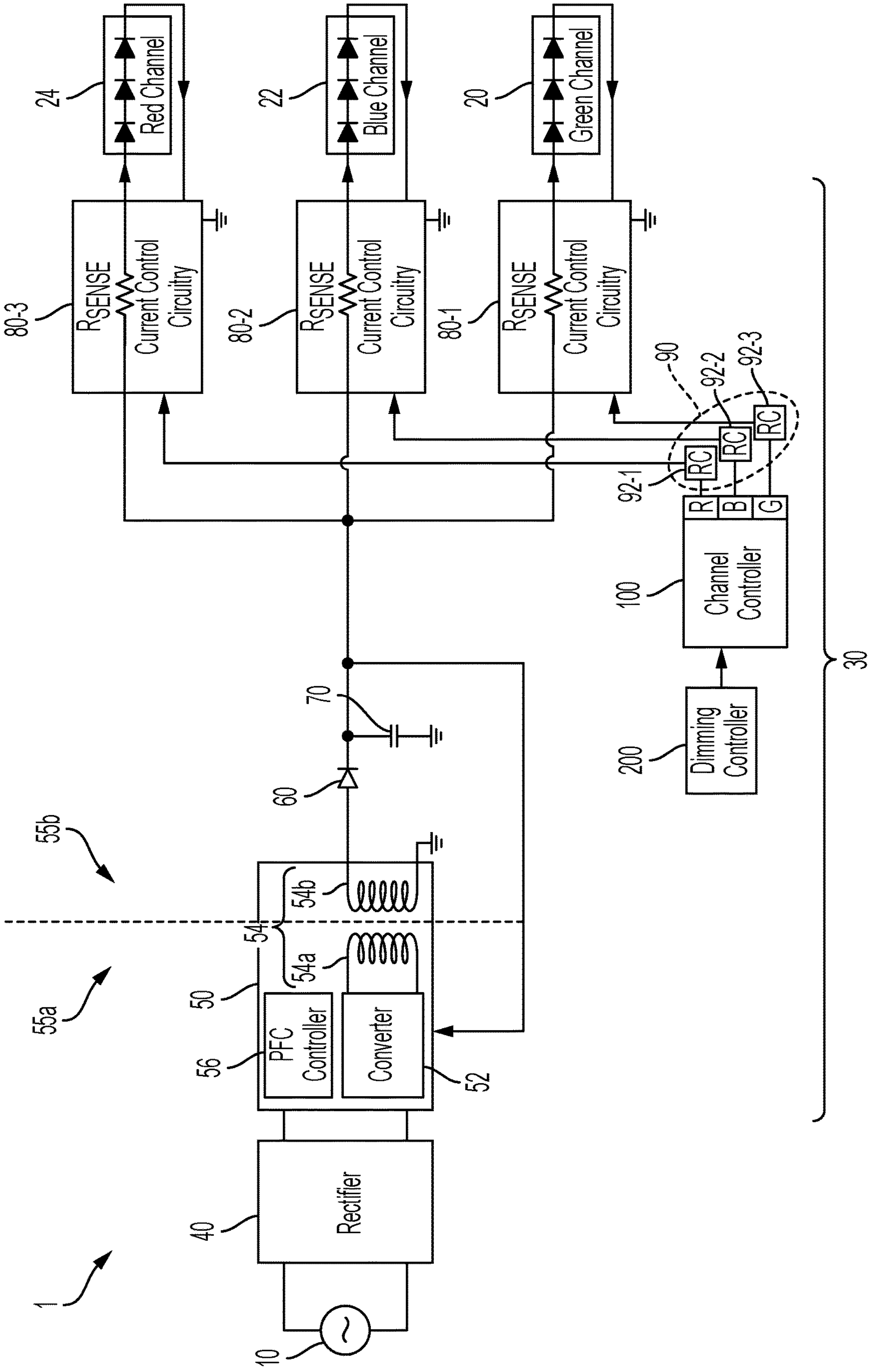
FIG. 1 illustrates a lighting system including a multi-channel light driver, according to some example embodiments of the present disclosure.

FIG. 1 illustrates a lighting system 1 including a multi-channel light driver 30, according to some example embodiments of the present disclosure.

According to some embodiments, the lighting system 1 includes an input source 10, a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, 277 Vac, or higher, for example. The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes an input rectifier (e.g., an input rectifier circuit) 40, a power supply (also referred to as a power supply circuit) 50, an output rectifier 60, a filter 70, a plurality of current control circuits 80-1 to 80-3, and a channel controller 100.

The input rectifier 40 may provide a same polarity of output for either polarity of the AC signal from the input source 10. In some examples, the input rectifier 40 may include a full-wave circuit using a center-tapped transformer, a full-wave bridge circuit with four diodes, a half-wave bridge circuit, or a multi-phase rectifier. The input AC signal may be about 90 VAC to about 305 VAC at 50-60 Hz.

The power supply circuit 50 converts the rectified AC signal generated by the input rectifier 40 into a drive signal for powering the plurality of color channels 20, 22, and 24. In some embodiments, the power supply circuit 50 includes a voltage converter 52 for maintaining (or attempting to maintain) a constant DC bus voltage on its output while drawing a current that is in phase with and at the same frequency as the line voltage (by virtue of a PFC controller/circuit 56). A transformer 54 inside the power supply circuit 50 produces the desired output voltage from the DC bus. In some examples, the power supply circuit 50 may include the PFC circuit (or PFC controller) 56 for improving (e.g., increasing) the power factor of the load on the input source 10 and reducing the total harmonic distortions (THD) of the light driver 30.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, the color channels 20, 22, and 24 share a common output rectifier (e.g., diode) 60 and filter (e.g., capacitor) 70, which convert the AC driving signal output by the secondary winding 54*a* of the transformer 54 into a DC channel current for driving the color channels 20, 22, and 24. The anode of the output rectifier 60 may be connected (e.g., directly connected) to the output terminal of the power supply circuit 50.

According to some embodiments, each of the plurality of current control circuits 80-1 to 80-3 is configured to adjust the channel current of the corresponding color channel 20/22/24 based on the drive signal from the power supply circuit 50 and a corresponding filtered reference signal (e.g., a pulse width modulated (PWM) signal) from the channel controller 100 and the filter circuit 90. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve. The channel controller 100 determines the color mix (e.g., the intensity of the red, blue, and green light colors) for each color temperature based on a lookup table that provides the light intensities of the different color channels. The tabulated color mix may accurately follow the black body curve.

The dimmer level may be determined based on a dimmer setting from a dimming controller 200, which may be in electrical communication with the channel controller 100, as shown in FIG. 1. However, embodiments of the present disclosure are not limited thereto. For example, the dimming controller 200 may also be a TRIAC or ELV dimmer at the input source 10. In some examples, the dimmer level at 100% may correspond to an output light intensity of about 5000 lumens.

Figure 2:
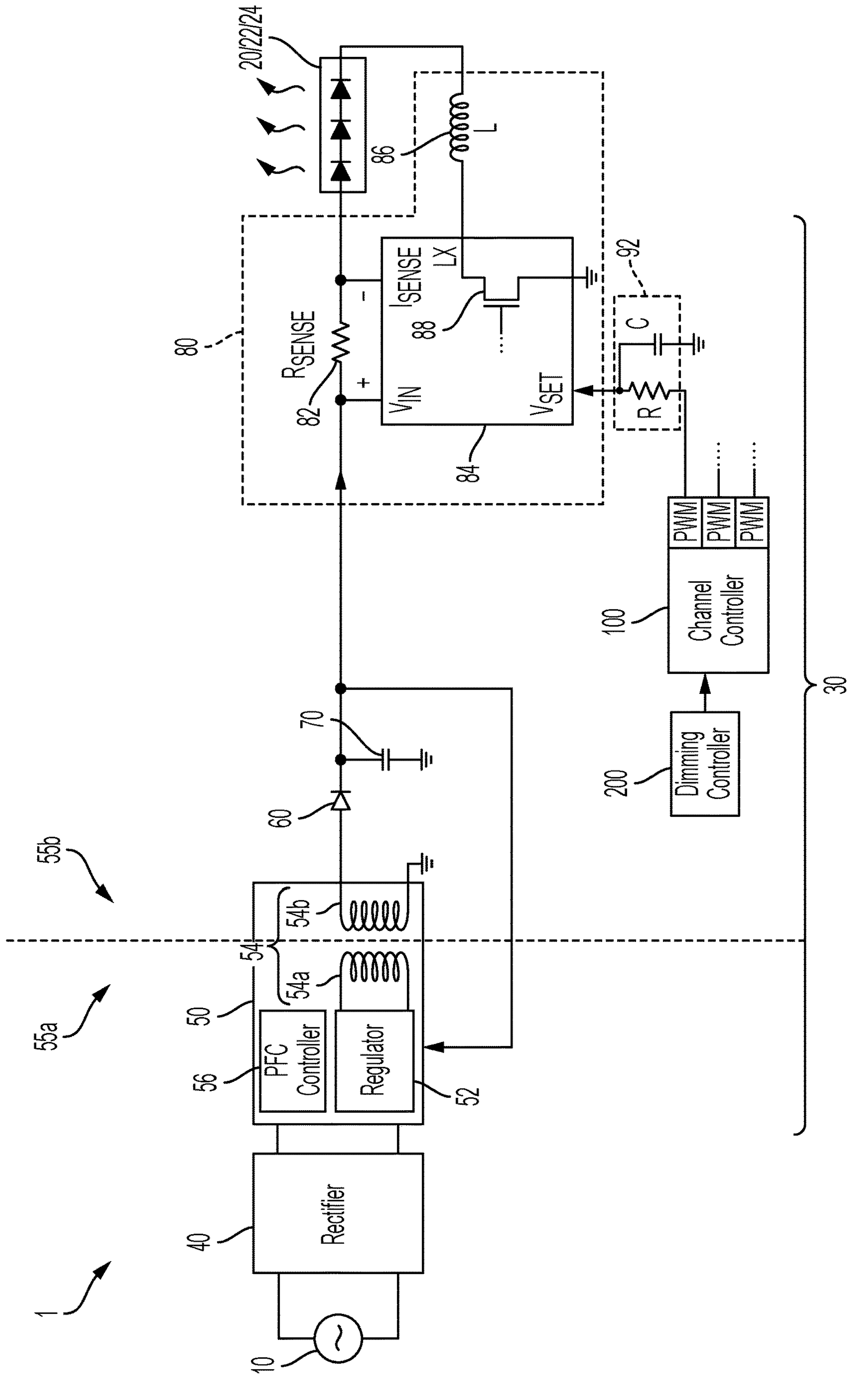
FIG. 2 illustrates a schematic diagram of a current control circuit of the multi-channel light driver, according to some embodiments of the present disclosure.

FIG. 2 illustrates a schematic diagram of a current control circuit 80 of the multi-channel light driver 30, according to some embodiments of the present disclosure.

Referring to FIG. 2, in some embodiments, the current control circuit 80 is electrically coupled to the secondary side 55*b* of the power supply circuit 50. The current control circuit 80 includes a sense resistor ($R_{SENSE}$) 82 that is coupled between the output of the power supply circuit 50 and the corresponding color channel 20/22/24 and is connected electrically in series with the corresponding color channel 20/22/24. The sense resistor 82 is configured to enable sensing of the channel current ($I_{CHANNEL}$) of the corresponding color channel 20/22/24.

In some embodiments, the current control circuit 80 also includes a regulator (also referred to as a buck regulator, a buck converter, or a step down converter) 84 configured to sense the output voltage of the power supply circuit 50 (e.g., at its VIN input), to sense the channel current via the sense resistor 82 (e.g., at its ISENSE input), to receive the reference signal (e.g., PWM signal) corresponding to the color channel 20/22/24 from the channel controller 100 (e.g., at its VSET input), and to regulate the channel current according to the sensed/received signals. The regulator 84 is configured to sense the current of the color channel 20/22/24 by measuring the voltage drop across the sense resistor 82 (via the VIN and the ISENSE inputs). In some embodiments, the channel current passing through the color channel 20/22/24 is routed back through the regulator 84 (via its LX input) to ground. The regulator 84 includes a switch (e.g., a metal oxide field effect transistor (MOSFET)) capable of switching the channel current on and off based on the sensed output voltage, the sensed channel current, and the reference signal. The current control circuit may also include an inductor 86 coupled between the color channel 20/22/24 and the regulator 84 and positioned in a current path of the channel current 20/22/24, which enables the regulator (e.g., the buck regulator) 84 to produce a regulated current. Thus, by controllably switching the channel current on and off, the regulator 84 may provide down-current regulation of the channel current.

According to some embodiments, to maintain accurate dimming down to 1% while reducing ripple in the channel current, a hybrid DC/PWM signal is applied to the regulator 84 to achieve the benefits of both DC and PWM dimming. In some embodiments, the hybrid DC/PWM signal is a pseudo-sawtooth waveform that is seen as an effective DC voltage when operating above the regulator's cutoff voltage (which may correspond to about 5% or higher dimming) and seen as a PWM signal after entering the cutoff region of operation of the regulator 84 (which may correspond to dimming below 5%).

According to some embodiments, to produce the pseudo-sawtooth signal, the channel controller 100 first generates the reference signal in the form of a PWM signal (e.g., a square PWM signal), which oscillates between two discrete values and has an adjustable/variable pulse width or duty cycle. The PWM signal is then filtered by a low pass filter 92 of the filter circuit 90 to produce the pseudo-sawtooth signal, which is a smoothly varying analog signal having a triangular or substantially triangular waveform. The low pass filter 92 may be a first order RC filter, as shown in FIG. 2; however, embodiments of the present application are not limited thereto, and the low pass filter 92 may be any suitable filter, such as a higher order filter or an RLC filter. Generating the pseudo-sawtooth waveform using a PWM signal and a filter obviates the need for a digital to analog converter (DAC) for each color channel, which would have increased the cost of the light driver.

The mode of operation of the regulator 84 is determined by the cutoff voltage associated with the VSET input, which causes the regulator 84 to shut off when the voltage at the VSET input drops below the cutoff voltage. While the voltage of the reference signal is above the cutoff voltage, the regulator 84 continuously adjust the channel current according to the effective DC value of the sawtooth signal at its VSET input. However, when the voltage of the sawtooth signal drops below the cutoff voltage, the regulator 84 is configured to turn off (e.g., disable the switch 88) thus shutting off the first channel current.

However, embodiments of the present disclosure are not limited to the output stage of the embodiments of FIGS. 1-2. For example, rather than use a regulator at the output stage, some embodiments of the present disclosure may utilize a voltage-controller resistor (VCR) to control the voltage supplied to the light channels.

Figure 3:
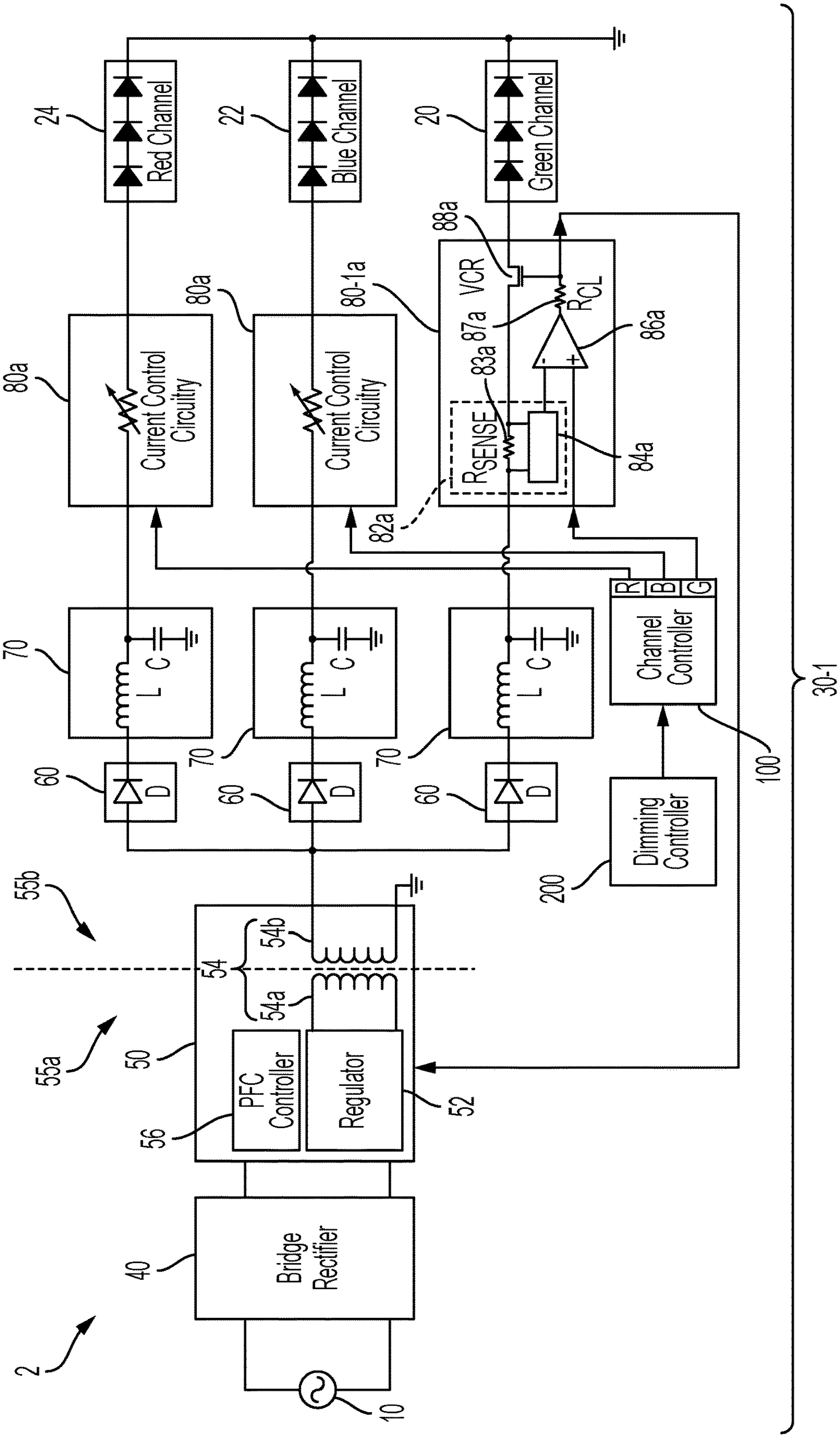
FIG. 3 illustrates a schematic diagram of a current control circuit utilizing a VCR, according to some embodiments of the present disclosure.

FIG. 3 illustrates a schematic diagram of a current control circuit 80*a* utilizing a VCR, according to some embodiments of the present disclosure.

Referring to FIG. 3, in some embodiments, the current control circuit 80*a* includes a current sensor 82*a* configured to sense a channel current ($I_{CHANNEL}$) of the corresponding color channel 20/22/24 and to generate a sense signal; an error amplifier (also referred to as a comparator) 86*a* configured to receive the sense signal from the current sensor 82*a* and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88*a* that is configured to adjust the corresponding channel current by dynamically adjusting a resistance of the VCR 88*a* based on the feedback signal from the error amplifier 86*a*.

In some embodiments, the current sensor 82 includes a sense resistor ($R_{SENSE}$) 83*a* that is coupled between the output of the power supply circuit 50 and the corresponding color channel 20/22/24 and is connected electrically in series with the corresponding color channel 20/22/24. The current sensor 82*a* also includes a current sense circuit 84*a* that is configured to sense a current of the color channel 20/22/24 by measuring the voltage drop across the sense resistor 83*a*, and to generate the sense signal that is provided to the error amplifier 86*a* (e.g., to the negative input terminal of the error amplifier 86*a*).

According to some embodiments, the VCR 88*a* is electrically connected in series with the sense resistor 83*a* and the color channel 20/22/24. In some embodiments, the VCR 88*a* is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage.

According to some embodiments, the feedback signal from the error amplifier 86*a* controls the resistance of the VCR 88*a* to regulate the channel current to a desired value, which corresponds to the reference signal. As the current control circuits 80*a* dynamically adjusts the resistance of the VCR 88*a* in response to the instantaneous changes in the channel current, the current control circuit 80*a* regulates the channel current to the desired level, as determined by the corresponding reference signal.

According to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80*a* associated with the green color channel 20; may generate a second reference signal corresponding to the desired blue color intensity to send to the second current control circuit 80*a* associated with the blue color channel 22; and may generate a third reference signal corresponding to the desired red color intensity to send to the third current control circuit 80*a* associated with the red color channel 24.

Referring to FIG. 3, in some embodiments, the power supply circuit 50 monitors the state of the VCR 88*a* of the current control circuit 80-1*a* and adjusts its output voltage (i.e., the output voltage of the secondary winding 54*b*) to reduce or minimize the voltage drop across the VCRs 88*a*. In some examples, current control circuit 80-1*a* corresponds to (e.g., is associated with) the green color channel 20.

In some examples, the feedback signal (also referred to as a correction signal) from the error amplifier 86*a* that controls the green color channel 20 is communicated to the power supply circuit. In some embodiments, the feedback signal is provided to the PFC controller circuit 56, which may perform power factor correction for the power supply circuit 50.

In some embodiments, when the error amplifier 86*a* of the current control circuit 80-1*a* determines to increase the drive current of the green color channel 20 (e.g., when increasing the intensity of the green light), the corresponding feedback signal, which is transmitted to the primary side 55*a*, notifies the power supply circuit 50-1 to increase its output voltage to ensure sufficient drive voltage for the green color channel 20 (and hence the blue and red color channels 22 and 24). Conversely, when the error amplifier 86*a* of the current control circuit 80-1*a* determines to decrease the drive current of the green color channel 20 (e.g., when reducing the intensity of the green light), the corresponding feedback signal notifies the power supply circuit 50-1 to decrease its output voltage to prevent excessive power dissipation by the VCRs 88*a*.

As such, by properly controlling the voltage headroom, the power supply circuit 50 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This greatly simplifies the control logic of the light driver 30-1, which translates to lower overall cost and size of the system.

According to some embodiments, the components of the light driver 1/2 are packaged within a multi-layered lighting system that has a multi-level printed circuit board (PCB) design that vertically stacks two or more PCB layers coupled by connectors/separators. The components of the lighting system 1/2 are mounted on the top side of the bottom PCB (e.g., main PCB) or on both the top and bottom sides of the remaining PCB board layers (e.g., daughter board layers). These layers may be added or removed in order to provide more space to mount all the components for the lighting system 1/2.

Figure 4:
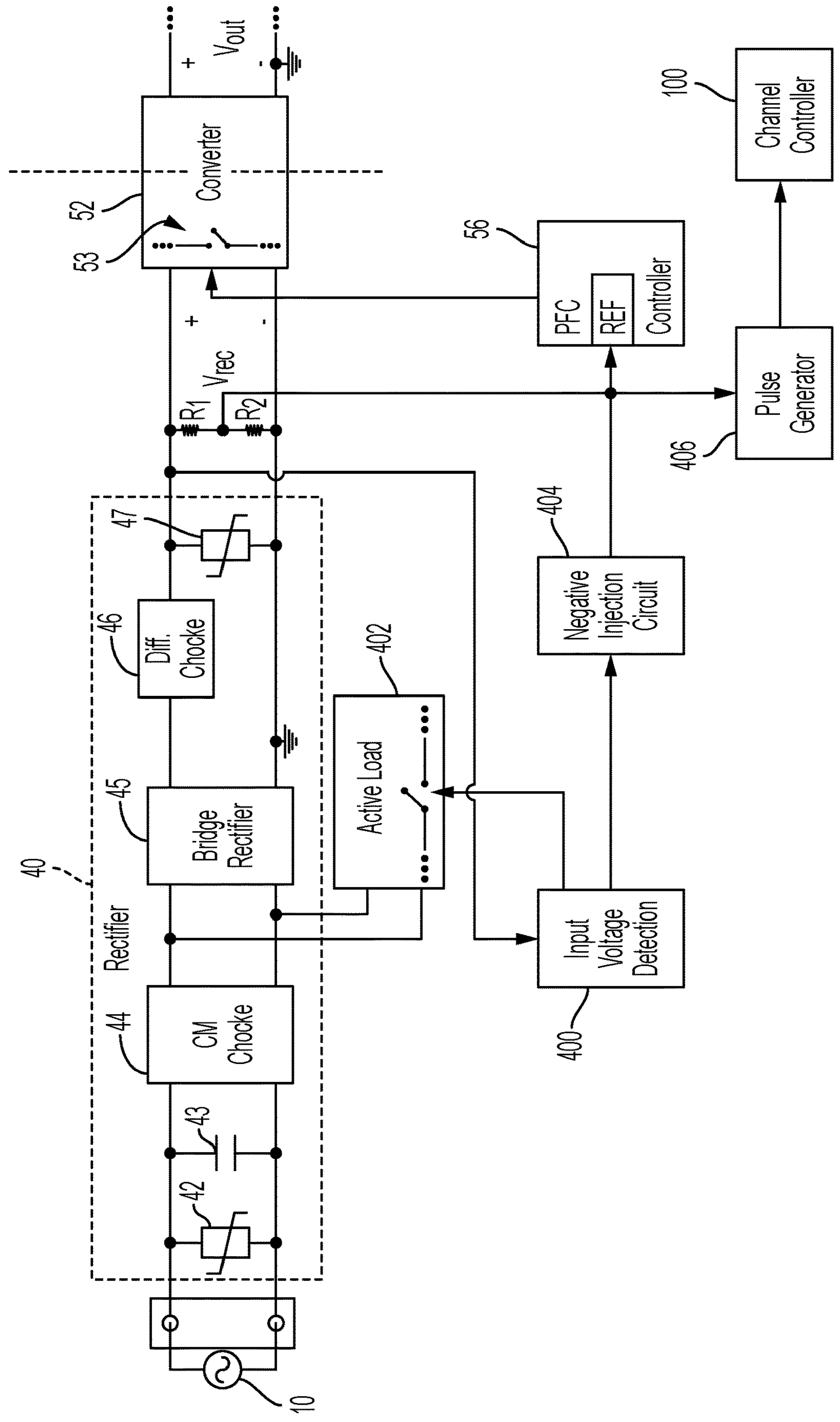
FIG. 4 illustrates a schematic diagram of the input stage of the lighting system, according to some embodiments of the present disclosure.

FIG. 4 illustrates a schematic diagram of the input stage of the lighting system 1, according to some embodiments of the present disclosure.

In some embodiments, the input rectifier 40 of the lighting system 1 includes a first metal oxide varistor (MOV) 42 and a capacitor (e.g., a bulk capacitor 43) coupled in parallel between the two input AC lines, a common-mode (CM) choke 44, a bridge rectifier 45, a differential choke 46, and a second MOV 47 coupled between the input lines to the converter 52.

The MOVs 43 and 47 may aid to suppress differential type spikes, which is where most of the energy of an energy surge is). An MOV may exhibit very high resistance (and essentially become an open circuit) when the input voltage is less than a threshold (e.g., 320 V), but exhibit very low resistance when the input voltage exceeds the threshold and effectively becomes a short circuit that returns the current back to the AC line and prevents the current from entering other parts of the lighting system circuit. As such, the MOV can suppress the massive current surge from a differential type lighting surge. While FIG. 4 illustrates MOVs on both sides of the bridge rectifier 45, embodiments of the present disclosure are not limited thereto, and the input rectifier may include only a single MOV on one side of the bridge rectifier 45. According to some examples, one or more of the MOVs 42 and 47 may be replaced with a transient voltage suppression diode (TVSD).

The CM choke 44 may suppress a common-mode electrical surge and may act as an EMI filter which substantially reduces or prevents fast transients from getting into or out of the lighting system 1. The CM choke 44 may be include two inductors (one on each AC line) that share the same core. The differential-mode choke 46 which may be on only one of the two input lines can aid to suppress differential-mode electrical surges.

According to some embodiments of the present disclosure, the input stage of the lighting system 1 includes an input voltage detector 400, an active load 402, a negative injection circuit 404, and a pulse generator 406.

The input voltage detector 400 that is configured to detect the voltage level of the haversine signal at the input of the converter 52. For example, the input voltage detector 400 may determine whether the input voltage is about 120 V or about 277 V or higher. When the detected voltage is about 120 V, the input voltage detector activates the active load 402 that is coupled to the input AC lines (e.g., between the CM choke 44 and the bridge rectifier 45). The active load 402 is primarily a resistive load that improves the performance of a TRIAC dimmer that may be coupled to the input of the lighting system 1. As TRIAC dimmers are not utilized at input voltages higher than 120 VAC, the input voltage detector 400 deactivates the active load 402 when the detected voltage is above 120 V.

Conversely, the input voltage detector 400 deactivates the negative injection circuit 404 when the input voltage is 120 V, and activates the negative injection circuit 404 when the input voltage is higher than 120 V (e.g., when it is 277 V or higher).

When sampling voltage for the reference pin of the PFC controller 56, it is desirable for the shape of the rectified input voltage $V_{REC}$ to be preserved as the inductor current of the converter 52 is limited by the sampled voltage which is fed to the reference pin REF of the PFC controller 56. According to some embodiments, the negative injection circuit 404, which is also electrically connected to the reference pin REF of the PFC controller 56, helps to preserve the voltage signal which enters the reference pin REF. This, in turn, allows the light driver 30 to maintain proper power factor and low total harmonic distortion (THD) of the input line current.

Without the negative injection circuit 404, an issue may arise when operating the light driver 30 at low loads where insufficient current is drawn by the load to fully discharge input filter capacitors that are incorporated in the converter 52 to hold the voltage up. The input filter capacitors serve to hold the voltage and it is desirable for them to be fully discharged prior to the next cycle of the rectified voltage.

According to some embodiments, the downshifting of the sampled rectified signal by the negative injection circuit 404 ensures that the light driver 30 is able to operate efficiently by keeping the inductor current of the converter 52 in-phase and at the same fundamental frequency as the sampled rectifier voltage, thus providing a high power factor and low THD.

Also, when the light driver 30 is operating at low output levels, the on time of the PFC controller may be lowered and high frequency switching at the converter 52 may increase. An increase in high frequency switching may induce more common mode noise that is observed entering the reference pin REF of the PFC controller 56. Because injecting a negative voltage to the reference pin REF to shift the sampled rectifier output voltage $V_{REC}$ ensures that the light driver 30 is able to operate efficiently (by keeping the inductor current of the converter 52 in phase and of the same fundamental frequency as the sampled rectifier voltage), high frequency switching at the converter 52 may decrease, which may result in less common mode noise.

As described above, the negative injection voltage-VDC supplied by the negative injection circuit 404 to the reference pin of the PFC controller 56 shifts the sampled rectifier signal downward in such a way that the signal entering the reference pin is that of a shifted haversine signal which has valleys that reach zero or close to zero (e.g., as close to zero as possible). Shifting the sampled haversine signal to reach zero or substantially zero ensures that high PF and low THD can be obtained. Without the valleys reaching near zero, the PFC controller 56 may not be able to properly maintain the inductor current in phase with, or of the same fundamental frequency as, the sampled voltage signal. The amount of negative voltage injected may be automatically adjusted by sensing the AC voltage and/or AC current that enters the drivers input. Further, the circuitry serves to reduce common mode noise that enters the multiplier pin.

In some embodiments, the pulse generator circuit 406 is coupled to the output of the rectifier 40 through a first voltage divider with first and second resistors R1 and R2 that attenuates the rectified input line voltage $V_{REC}$ to produce a rectified signal, which the pulse generator circuit 406 utilizes to generate a pulsed signal (e.g., a pulse-width-modulated (PWM) signal) that corresponds to the signal received by the rectifier 40, which may be a chopped waveform from a dimmer (e.g., a TRIAC dimmer or a 0-10V dimmer). Thus, the pulsed signal is indicative of the light dimming level (e.g., the dimming level set by a user via a phase-cut dimmer). As such, the pulse generator circuit 406 provides this signal to a PWM input of the channel controller 100 so that the controller 100 may determine the dimming level set by a user at the phase-cut dimmer and adjust the light output intensity of the light channels 20/22/24 accordingly.

Figure 6:
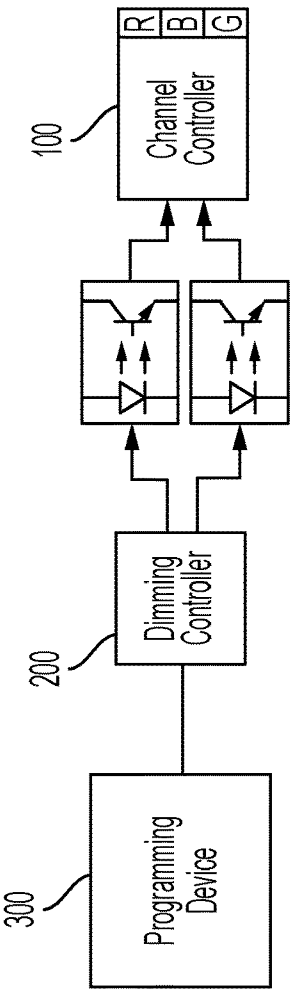
FIG. 6 illustrates the connection between the programming device, the dimming controller, and the channel controller of the lighting system, according to some embodiments of the present disclosure.
Figure 5:
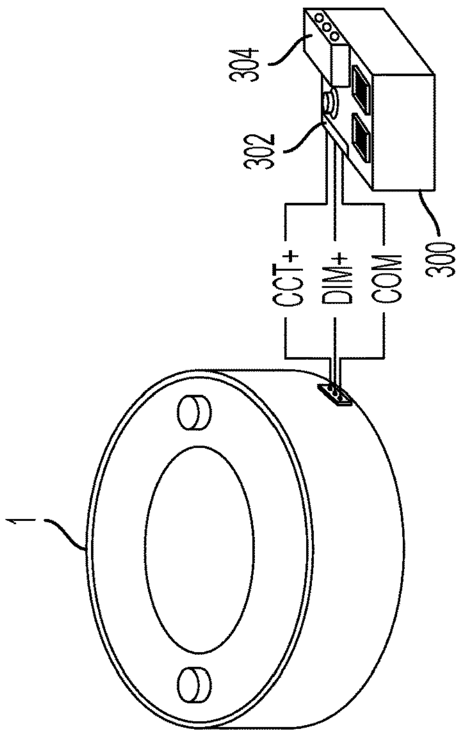
FIG. 5 illustrates a programming device of the lighting system, according to some embodiments of the present disclosure.

FIG. 5 illustrates a programming device 300 of the lighting system 1, according to some embodiments of the present disclosure. FIG. 6 illustrates the connection between the programming device 300, the dimming controller 200, and the channel controller 100 of the lighting system 1, according to some embodiments of the present disclosure.

Referring to FIGS. 5-6, in some embodiments, the CCT value and the dimming level of the lighting system 1 may be set or programmed in memory by a programing device 300 is capable of initiating programming mode of the lighting system 1. During normal operation, the lighting system 1 may rely on the programmed values to set/determine the CCT and/or dimming level of the output light. In some examples, the programming device 300 may connect to and interfacing with the dimming controller 200 of the programmable lighting system 1 via lead wires 302 or a block connector 304.

Because the lighting system 1 is a self-contained light engine whose only connection to the outside world is through the two AC input lines, and the lead wires/connector to the programming device 300, it is desirable to electrically isolate the dimming controller 200 from the rest of the circuit within the lighting system 1. As such, in some embodiments, the dimming controller communicates the programming values of the dimming level and CCT values to the channel controller 100 via one or more optocouplers. By maintaining this electrical isolation, the lighting system

1 may also satisfy the EMI requirements that are imposed on devices that connect directly to wall AC.

According to some embodiments, the compact lighting system 1 includes the power supply, which converts AC to DC, and the light source (e.g., LEDs) in one compact package having a round aperture. The lighting system 1 is fully configurable and can be programmed (on the production line or in operation) to produce any light output color, and any light intensity (e.g., 3k or 4k lumen). It also has a transceiver onboard that allows it to be reprogrammed at any time (e.g., after installation). This eliminates the need to produce and manufacture different lights for different applications, which greatly reduces inventory and can improve product profitability. In some examples, the lighting system 1 is intended to be a replacement for a chip on board (COB) light that includes a panel of tightly packed LEDs (i.e., high density of LEDs in a small area) and is capable of emitting a powerful and consistent/uniform beam (e.g., conical beam) of light. COBs, and hence the lighting system 1 of the present disclosure, can be used for aesthetics purposes in architectural designs, or can be used for illumination in general lighting applications. Commercially available COBs have a standard size, which this lighting system 1 needs to fit to. In some embodiments, the physical properties (e.g., form factor, dimensions, etc.) of the can of the lighting system 1 conform with the Zhaga standard defined by the Zhaga consortium (https://www.zhagastandard.org).

The input to the system 1 is an AC signal that may be provided by a neutral line and one power line from the wall (i.e., no ground line). The lighting system 1 may receive AC input from about 90 VAC to about 305 VAC (which is considered to be a high voltage). The system 1 performs the voltage conversion (AC-DC), and produces the desired light output. This is in contrast to the related art in which the light engines input DC voltages and relay on external power supplies that convert wall AC into a DC voltage. By incorporating the AC-DC voltage converting power supply into the same package as the light driver, the system 1 eliminates the need for an additional power supply, which saves cost and simplifies installation. However, as a result of this integration, the lighting system 1 encounters significant issues related to high voltages requirements, powerline quality requirements, thermal concerns, and insulation requirements, which the related art need not be concerned with nor address. Thus, embodiments of the present disclosure include features and solutions that significantly alleviate or completely eliminate the above concerns.

As noted above, one challenge to be overcome by the lighting system 1 is complying with power line quality requirements, which demand that the lighting system 1 be able to withstand lightening surges of about 2500 V on the AC lines at the input of the lighting system 1, which are the only high-voltage input into the unit. Two different types of surge that the lighting system 1 can withstand include differential surge between the two AC lines, and common mode surge, which is between one of the AC lines and ground. Both types of surges may be suppressed at least in part by the MOVs 42 and 47 of the rectifier 40 (see, e.g., FIG. 4).

Further, the lighting system 1 has to satisfy mandatory safety requirements related to insulation. As such, the lighting system 1 strategically employs insulation to avoid arcing between components, which could otherwise damage or destroy such components and to make the unit safe to touch by a user.

The light engines of the related art do not include any high energy surge suppression (only low level static charge/discharge) as, in the related art, the AC-DC power supply is outside of the lighting unit, and the power line quality requirements are exported to the external power supply, and thus not addressed by the light engine. Further, as the light engines of the related art operate at low voltages, user safety issues are minimal or non-existent. The following will describe in further detail the intelligent packaging of components and insulation use that allows all of the necessary components lighting system 1 to satisfy the added power line surge and insulation requirements.

Furthermore, thermal considerations are of great importance to the lighting system 1 as it incorporates the heat-generating light source (e.g., LEDs) within the same small can/packaging as all other components, and unless the generated heat is not dissipated properly, the rise in temperature within the light sources and the internal components can adversely affect the operation of the lighting system 1. Thus, in some embodiments, the lighting system 1 utilizes a metal heat sink as its backing which may efficiently transfer the internally-generated heat to the outside (e.g., via a heatsink fixture attached to the back of the lighting system 1).

Additionally, as the lighting system 1 is capable of directly connecting to wall AC, its has to satisfy stringent EMI requirements (such as class B and FCC/worldwide requirements related to radiative emissions) that include not injecting noise on, and not adding extra harmonics or distortions to, the AC input lines, and limiting radiative noise outside of the lighting system packaging/can. The primary switch 53 within the converter 52 (see, e.g., FIG. 4), which is controlled by the PFC controller 56, switches and pumps power rapidly during normal operation (e.g., at about 200 KHz) and produces a lot of broadband noise (e.g., common mode noise) and ringing throughout the circuitry of the lighting circuit 1. As the circuitry of the light driver 30 sits atop the metal backplate and is insulated from it by thin insulating layers, this structure acts as a large capacitor that may direct much of this noise (e.g., common mode noise) to the ground plane of the metal backing and thus the rest of internal circuitry. Accordingly, as will be described below, embodiments of the present disclosure address this issue through a variety of techniques.

Figure 7A:
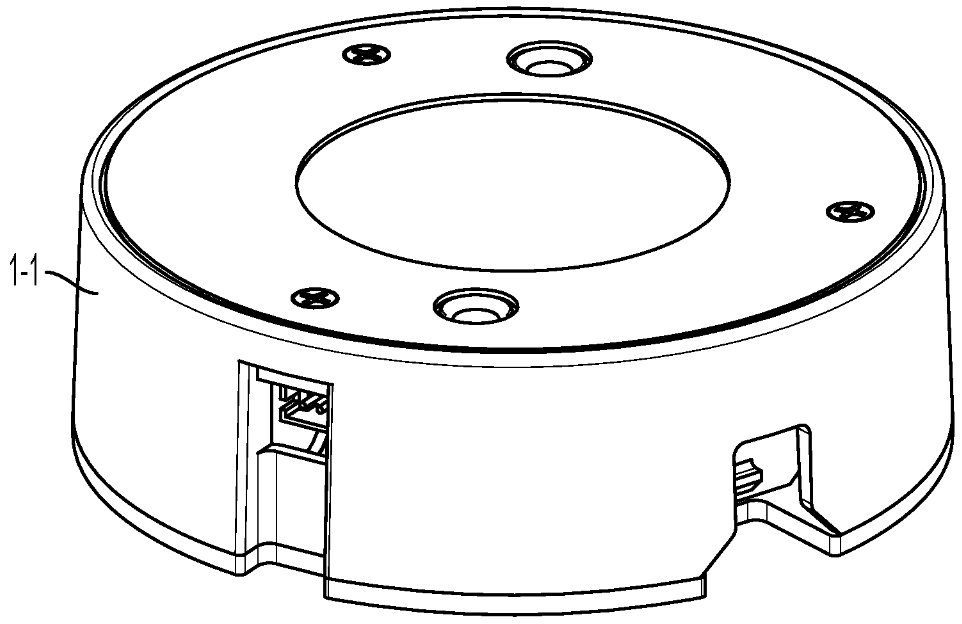
FIG. 7A illustrates a perspective view of a lighting system, according to some embodiments of the present disclosure.
Figure 7B:
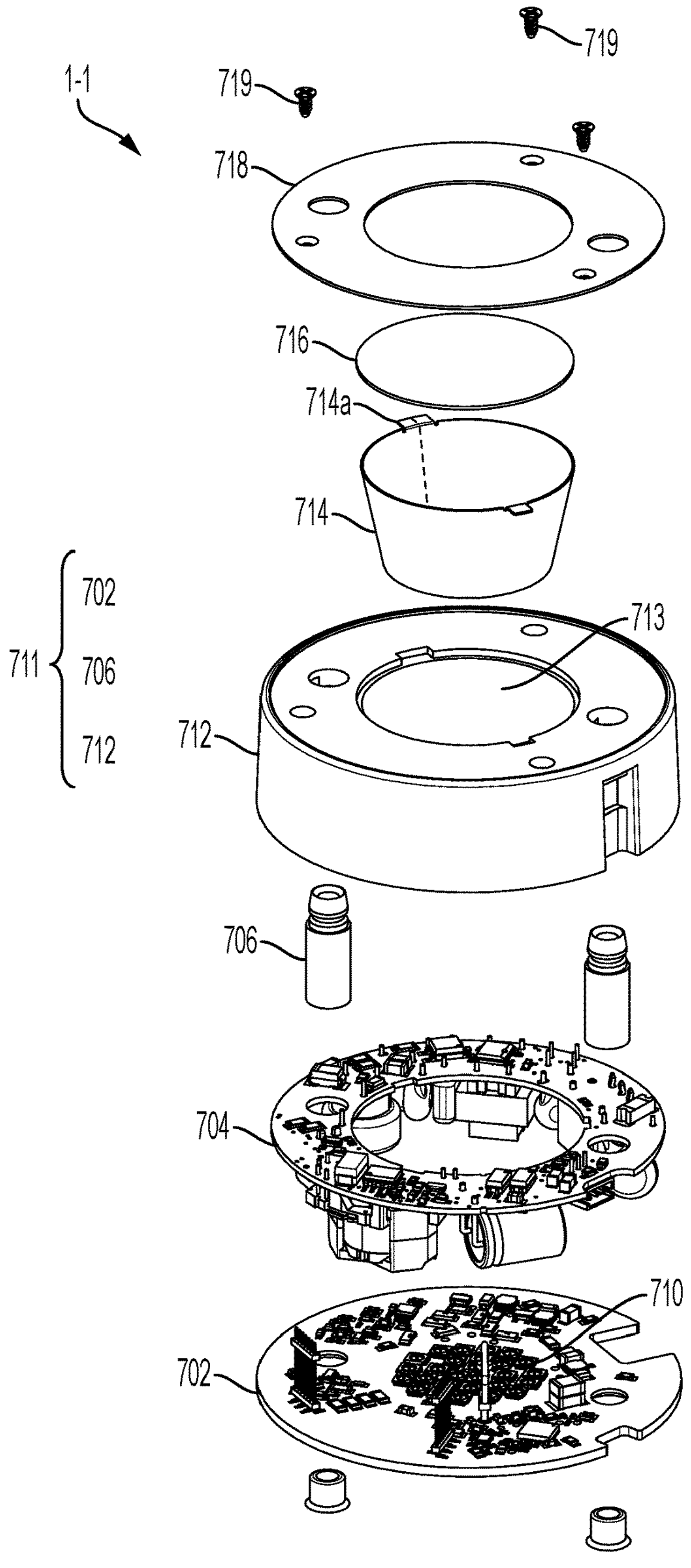
FIG. 7B illustrates an exploded perspective view of the lighting system, according to some embodiments of the present disclosure.
Figure 7C:
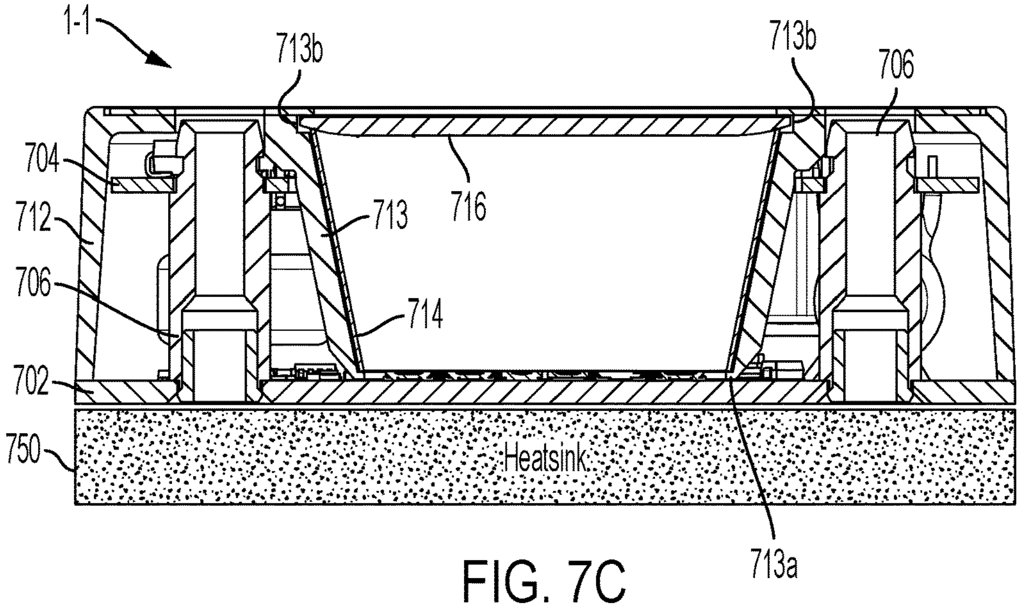
FIG. 7C illustrates a cross-sectional view of the lighting system, according to some embodiments of the present disclosure.
Figure 7D:
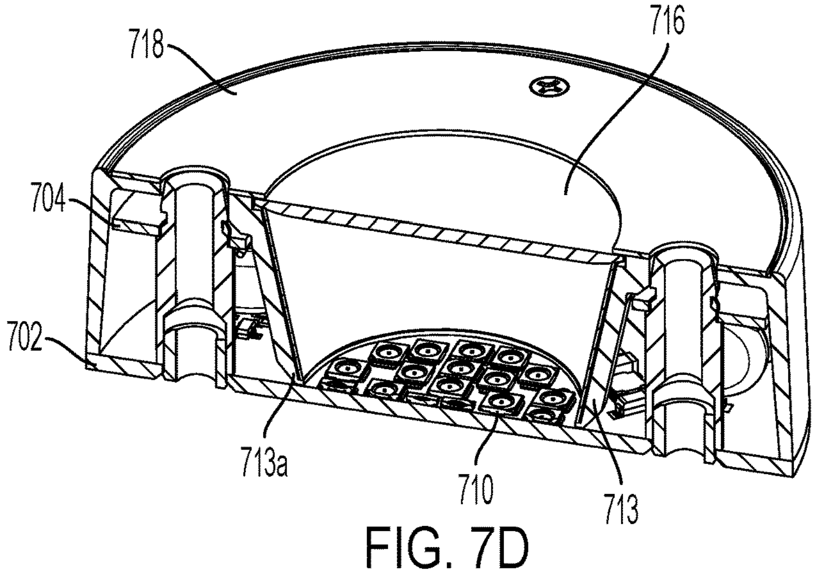
FIGS. 7D and 7E illustrate cutaway perspective views of the lighting system equipped with two different LED arrays, according to some embodiments of the present disclosure.
Figure 7E:
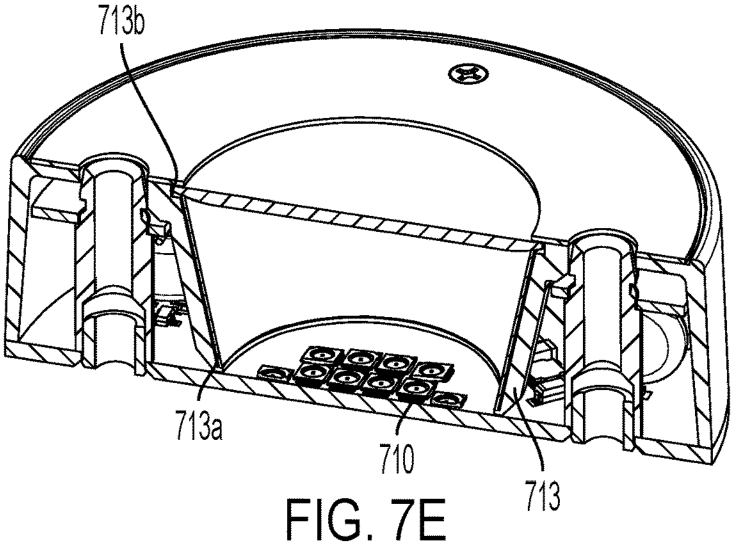
Figure 7G:
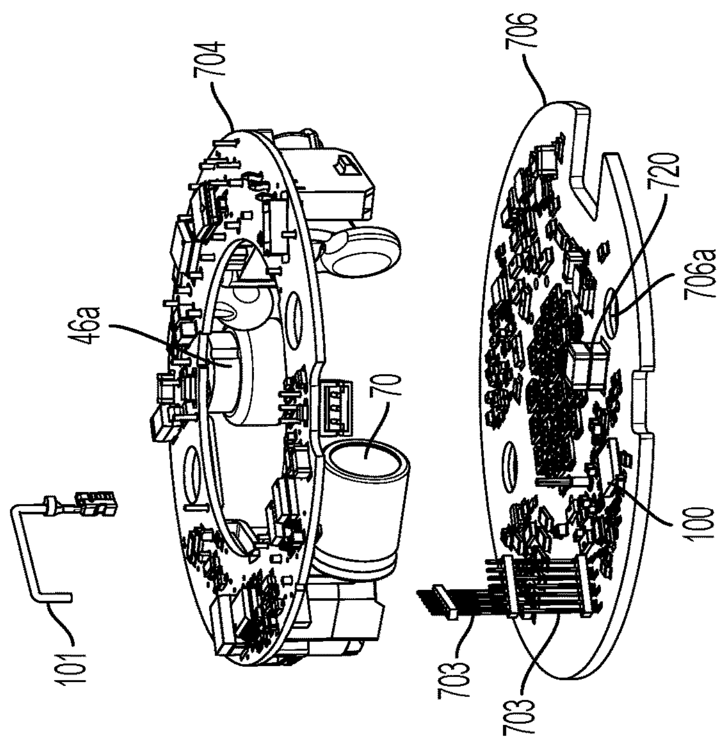
FIGS. 7F and 7G illustrate exploded perspective views of two PCB layers of the lighting system on which the internal electrical components are mounted to, according to some embodiments of the present disclosure.
Figure 7F:
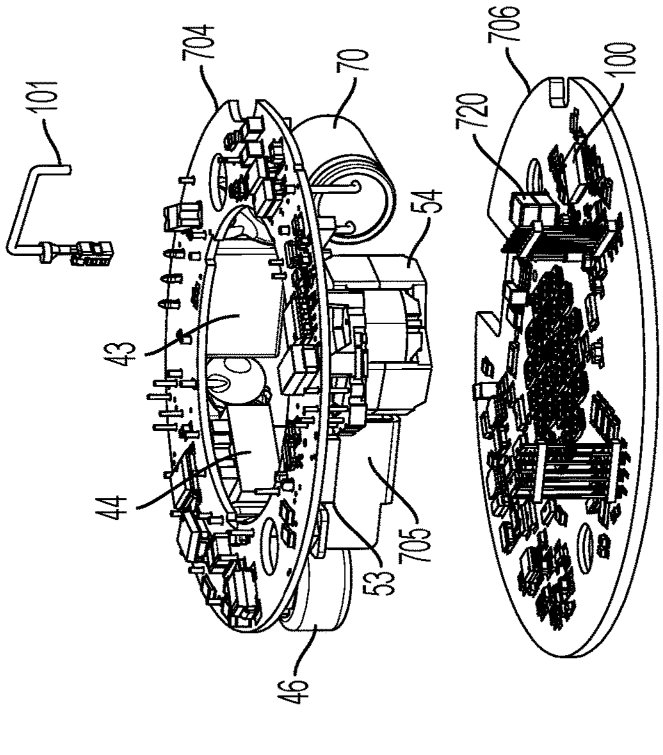
Figure 7H:
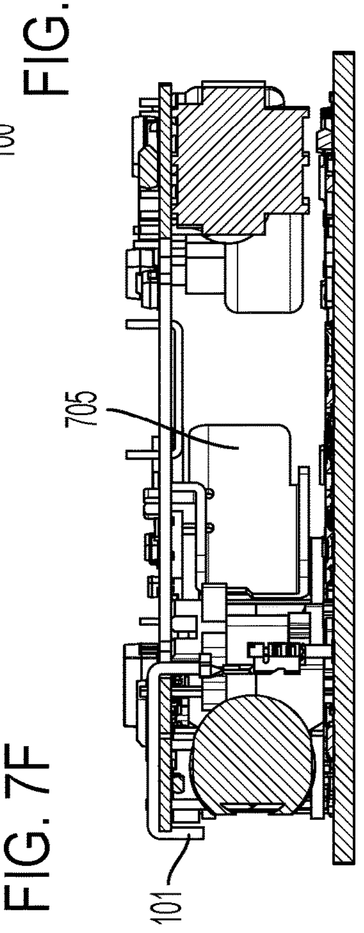
FIG. 7H illustrates a cross-sectional view of the two PCB layers of the lighting system, according to some embodiments of the present disclosure.

FIG. 7A illustrates a perspective view of the lighting system 1-1, according to some embodiments of the present disclosure. FIG. 7B illustrates an exploded perspective view of the lighting system 1-1, according to some embodiments of the present disclosure. FIG. 7C illustrates a cross-sectional view of the lighting system 1-1, according to some embodiments of the present disclosure. FIGS. 7D and 7E illustrate cutaway perspective views of the lighting system 1-1 equipped with two different LED arrays, according to some embodiments of the present disclosure. FIGS. 7F and 7G illustrate exploded perspective views of the two PCB layers of the lighting system 1-1 on which the internal electrical components are mounted to, according to some embodiments of the present disclosure. FIG. 7H illustrates a cross-sectional view of the two PCB layers of the lighting system 1-1, according to some embodiments of the present disclosure.

Referring to FIG. 7A, the lighting system 1-1 is a tunable AC-input white LED engine having a wide light-emitting surface (LES) and high lumen output, which makes it suitable for general illumination applications. In some examples, the lighting system 1-1 may be a cylindrical light fixture having a diameter of about 65 mm; however, the diameter is not limited thereto and the diameter may be about 61 mm or less. The flat top may have an aperture (e.g., a round lens) with an LES of about 32 mm. The light system 1-1 may be able to produce high light output of about 2500 lm or even as high as 5000 lumens across a range of CCT settings. In some examples, the lighting system 1-1 may utilize 3-channel de-saturated (Fusion) LEDs to achieve precise blackbody line (BBL) tuning.

Referring to FIG. 7B, the lighting system 1-1 has a 2-layer structure including a first layer (e.g., a first printed circuit board (PCB) layer or a substrate PCB layer) 702, and a second layer (e.g., a second PCB layer) 704 coupled to and vertically offset from the first layer 702 by two or more base posts 706. The first layer 702 may include a single-layer (e.g., a single-metal-layer) PCB, and the second layer 704 may include a PCB with one or more layers (e.g., metal layers). In some embodiments, the first layer 702 includes a metal layer on its rear side/backside (which faces away from the second layer 704), which may act as a heatsink for the components mounted on its top side (which faces the second layer 704).

In some embodiments, the first layer 702 has a first component area at its periphery and a first light area at its center, and the second layer 704 has a second component area overlapping the first component area of the first layer 702 in a plan view and has a first opening overlapping the first light area of the first layer 702 in a plan view. The first component area may surround the first light area, and the second component area may surround the first opening. Electronic components may be laid out on the top surface of first layer 702 (mostly or entirely within the first component area), and on one or both sides of the second layer 704 (within the second component area).

In some embodiments, the integrated multi-layered lighting system 1-1 includes a light source 710 that includes a plurality of light emitting diodes (LEDs) coupled to the first layer 702 and positioned in the first light area, which corresponds to the first opening of the second layer 704. The first opening of the second layer 704 allows for the light produced by the light source 710 to pass through the second layer 704 without obstruction and to illuminate the target environment. The light source 710 may include one or more green LEDs of the green channel 20, one or more blue LEDs of the blue channel 22, and one or more red LEDs of the red channel 24. In some examples, the LEDs 710 are unsaturated LEDs, which serve to provide a more vibrant and consistent color to illuminated objects as compared to saturated LEDs. Unlike saturated LEDs, which may lack certain bands of light from the visible light spectrum, unsaturated LEDs produce light evenly among the spectrum and consistently fill in empty spaces on the light spectrum that otherwise may not be filled by saturated LEDs.

In some embodiments, the lighting system 1-1 includes a housing 711 that encases/encapsulates the components within the lighting system 1-1, such as the power supply 50, the light driver 30, and the light source 710, and protects them from the elements. The housing 711 may include a base plate that may be the first layer 702, a case cover 712, and the base posts 706 that are configured to couple the base plate 702 and the case cover 712. At its center, the case cover 712 may have an inwardly tapered portion (e.g., an inner wall or an inner/inward extension portion) 713 that defines a housing opening (e.g., an inwardly tapered opening) that can act as a light tunnel directing light produced by the LEDs 710 to the outside. The inwardly tapered portion 713 has an inner diameter that increases in a vertical direction away from the light source 710 toward the outside (e.g., towards the lens 716). The bottom edge 713*a* of the tapered portion 713 having the smallest inner diameter may encapsulate the light source 710 in a plan view (i.e., the light source 710 is entirely within the opening of the housing 711 in a plan view. A reflector (e.g., tapered reflector; such as, a metal reflector) 714 may be placed inside the case/housing opening (e.g., on the inwardly tapered portion 713) to reflect light of the light source 710 incident on the interior surface of the tapered portion 713 of the case cover 712 to the outside, and thus ensure that the light produced by the light source 710 is not absorbed by the interior walls of the case/housing opening. This may improve (e.g., increase) the light extraction efficiency of the lighting system 1-1. As shown in FIG. 7B, the reflector 714 may have one or more lips 714*a* that fit within corresponding notches in the case cover 712 and thus allow the reflector 714 to stay in a fixed position relative to the case cover 712. A lens (e.g., a glass lens) 716 may fit within a peripheral notch (or stepped portion) 713*b* of the case cover 712 and be held in place above the light source 710 by a cap (e.g., a ring-shaped hold-down cap) 718 that is configured to be fixedly attached to (e.g., fastened or screwed to) the top of the case cover 712, for example, via one or more screws 719.

The base posts 706 may extend vertically from the base plate 702 to the top of the case cover 712 within the interior space of the housing 711. The base posts 706 may not only couple the case cover 712 to the base plate 702, but they also support the second layer 704 above the base plate 702. In some examples, the base posts 706 may have a hollow interior allowing a fastener to pass therethrough and couple the lighting system 1-1 to a heatsink mount (e.g., a fixture heatsink) 750, which may be a passive heat exchanger or an active heat exchanger (e.g., including a fan).

As the light source 710 may generate a lot of heat in the tightly confined space of the lighting fixture 1-1, thermal management is an important consideration for proper and stable operation of the lighting system 1-1.

To improve the dissipation of heat generated by the light source 710, the first layer 702 includes a metal core layer at its backside opposite to the light source 710, which is thermally and electrically conductive and is configured to be mounted to a heatsink mount 750. The metal core layer is configured to provide electrical ground to the light source 710 and other electrical components on the first layer 702, and to transfer (e.g., dissipate) the heat generated by the light source 710 during operation to the lighting system 1-1. The metal core layer may be a metal plating that extends continuously or substantially continuously across the bottom surface of the first layer 702 and has sufficient thickness to maintain the temperature of the light source 710 at a desired temperature range of, for example, about 30° C. to about 40° C. Without the heat sink properties of the metal core layer 106, the LEDs 710 may operate at significantly higher temperatures (e.g., about 20° C. to 30° C. higher), which could lead to a change in the LED characteristics and to an undesirable change in the color and intensity of the light output of the lighting system 1-1. In some examples, the metal core layer includes a thermally and electrically conductive material (e.g., one with sufficiently low heat resistance and electrical sheet resistance), such as aluminum, copper, and/or the like. The metal core layer may act as the safety ground of the lighting system 1-1.

The lighting system 1-1 includes a plurality of first components coupled to the first layer 702 and positioned in the first component area, and a plurality of second components coupled to the second layer 704 and positioned in the second component area. According to some embodiments, the plurality of first components include surface-mount electrical components, and the plurality of second components include through-hole-mounted electrical components. In some examples, the first components 208 may not include any through-hole components to avoid utilizing plated/insulated vias to insulate through-hole pins of such components from the grounded metal core layer 206, which could increase cost of the lighting system 1-1.

The first components may be positioned on (e.g., soldered to) the top surface (i.e., forward-facing side) of the first layer 702 that is opposite from the metal core layer, and are electrically coupled to one another via a plurality of traces. The second components may be placed on at least one of the rear-facing side of second layer 704 (which faces the top side of the first layer 702) and the top side (i.e., forward-facing side) of the second layer 704 (which is opposite from the bottom side of second layer 704), and are connect to one another through traces running on the top and/or bottom of the second layer 704. The second components on opposite sides of the second board 210 may also be electrically connected through one or more electrical vias within the second layer 704.

Referring to FIGS. 7F-7H, in some examples, the plurality of first components mounted to the first layer 702 may include the channel regulators 80, the input voltage detector 400, the pulse generator 406, and the channel controller 100. The plurality of second components mounted to the second layer 704 may include the rectifier 40 (and its many constituent components, such as input bulk capacitor 43, the CM choke 44, and differential choke 46), the active load 402, the negative injection circuit 404, the PFC controller 56, the converter 52 (including the switch 53), the bus rectifier 70, the dimming controller 200 and the associated one or more optocouplers. Thus, the noisy, high voltage and fast switching components of the lighting system 1-1 may be mounted to the second layer 704, which are separated from the quieter and lower-voltage elements of the lighting system 1-1 via an air gap between the first and second layers 702 and 704. As the primary switch 53 of the converter 52 may heat up during normal operation, a heatsink (e.g., a copper heatsink) may be placed on it to help dissipate heat and improve thermal management.

In some embodiments, to further improve vertical space utilization, one or more of the second components, such as the differential choke may be mounted to one side of an intermediary board (e.g., choke holder) 46*a*, which is fixed to and offset from the bottom surface of the second layer 704. This allows other components (e.g., small resistors and capacitors of, e.g., the active load 402) to be mounted to the other side of the intermediary board 46*a* thus resulting in even more space savings and thus achieving a higher part density within the confined packaging of the lighting system 1-1.

As there is an air gap between the first and second layers 702 and 704, to improve space utilization and bulkier of the second components (e.g., 43, 44, 46, 53, 54, 70, and 705) may be mounted to the underside of the second layer 704, which faces the first layer 702. Additionally, by placing these components, which also may be the some of the main heat producers in the lighting system 1-1 (aside from the light source 710), in close proximity to the metal back plate of the first layer (and hence the fixture heatsink mount 750), heat dissipation may be improved and thermal management may be improved. Thermal gap pads may be placed between the bottom surfaces of one or more of these components and the components and/or first layer below, which can further improve heat dissipation through the back metal plate. The thermal gap plates may have a low thermal resistance (be thermally conductive), but be electrical insulators so as to avoid creating unintentional electrical connections between components of the first and second layers 702 and 704. Further, the adhesive nature of the thermal gap pads helps to improve the stability and structural integrity of the two layers 702 and 704 (as they are otherwise held together by two base posts 706).

In some examples, the second components mounted on the second layer 704 may be electrically connected to the first components of the first layer 702 via one or more electrical connectors/links 703.

In some embodiments, the channel controller 100 has an internal wireless transceiver (e.g., with bluetooth and/or wifi capability), which may allow the lighting system 1-1 to be dimmed or generally programmed remotely. As such, an antenna 101 of appropriate length may be coupled to the first layer 702 (e.g., via an antenna pin and connector) and may extend over the second layer 704 as shown in FIGS. 7F-7H.

As noted earlier, in the embodiments of FIGS. 7A-7H, the conductors (e.g., traces and other metal components and leads) on the top surface of the first layer 702 together with the insulation layer below and the back metal plate create a large capacitor that attracts much of the noise (e.g., common mode noise) generated by the lighting system 1 (e.g., by the primary switch 53) to the metal backplate, which acts as both a heatsink and a safety ground, and thus to the other components of the lighting system 1 based on impedances. In effect, the backplate may acts like a magnet for common mode noise. It is desirable to redirect the impedances so that the noise comes back from the ground plate to the primary switch 53 in the converter 52, which is where much of the noise originates from. Thus, according to some embodiments, the lighting system 1-1 further includes a strategically-placed decoupling cap (of, e.g., about 4.7 μF) that is electrically connected between the safety ground of the back plating of the first layer 702 and the local ground (e.g., driver ground) of the circuitry of the lighting system 1-1. The decoupling cap provides a capacitive return path for the high dV/dt common noise back to the primary switch 53 of the converter 52. Because, when installed, the backplate of the first layer 702 may be connected to earth ground and because the input AC voltage to the lighting system may be several hundred VAC, there may be a significant voltage difference between the safe ground (e.g., earth ground) and the driver ground. Additionally, this voltage difference may reach 2-3 kV in the case of surges (e.g., lighting surges). As such, the decoupling capacitor 720 may have a high voltage rating and be capable of withstanding 4 kV surges. Therefore, the decoupling capacitor 720 may be a physically large component.

In some embodiments, in order to electrically connect the decoupling capacitor 720 (i.e., the surface-mount safety capacitor) in an efficient manner, this large capacitor 720 is placed near the grounded post 706 that connects to the aluminum/copper plate at the back of the first layer 702. In some examples, an electrode of the decoupling capacitor 720 may be soldered to the base post 706 as it is metallic and connected to the backplate. However, creepage/clearance requirements (of, e.g., 2.5 mm) around the solder may use up valuable space on the first layer 702 and performing the solder during the manufacturing process may be a difficult/expensive operation. In other examples, this connection may be established though a via that passes through the first layer 702; however, this introduces similar creepage limitations around the via, which may also complicate trace routing on the layer 702. Therefore, in some embodiments, an electrode of the decoupling capacitor 720 is connected to a wire that protrudes/projects into the hole 706*a* through which the base post 706 is to pass, and once the post 706 is pressed through that hole 706*a*, it pulls the wire down along the vertical path. As such, the wire can run vertically on the side of the post 706 and hole 706*a* and connect to the aluminum/copper backing. Therefore, this may establish a good solid electrical connection between the cap electrode and conductive back-plate. The other electrode of the decoupling/safety capacitor 720 is connected to the driver ground, which is routed back to the primary switch 53 on the second layer 704 through a vertical pin/link connecting the two layers 702 and 704 to one another. This presents a priority path (decoupling path) for noise. That is, it offers a lowest impedance path for the noise to go from the backplate back to the primary switch 53. The decoupling/safety capacitor 720 blocks a DC current path through it, and its capacitance is small enough such that the AC leakage current is small.

In some embodiments, the base posts 706 are insulated from ground (e.g., safety ground. For example, the base post 706 may made of insulating materials to prevent components of the lighting system 1-1 from being accidentally connected to electrical ground. In some examples, the base posts 706 may be made of conductive material and be safety grounded. In such examples, it is desirable to insulate the posts from the rest of the lighting system circuit. Therefore, the housing 711 may include insulated post covers (e.g., plastic post covers) that cover and insulate the base posts 706 and prevent other electrical components from making physical and electrical contact with the base posts 706. In some examples, post insulation may be achieved through wrapping insulative tape around the post. However, these are merely examples, and any other suitable means of insulating conductive base posts 706 from the lighting system circuitry may be employed.

In some examples, the first layer 702 may be substantially circular and the second layer 704 may have a ring shape. Further, the first and second layers 702 and 704 may have the same or substantially the same diameter; however, embodiments of the present disclosure are not limited thereto, and the first and second layers 702 and 704 may have any suitable shape and size to fit within a compact housing or an existing wall fixture.

Accordingly, as described above, the multi-tiered design of the lighting system 1-1 provides additional surface area to mount the various components of the light driver 30 in the vertical direction, which allows the lighting system 1 to have a more compact design with a smaller footprint, as compared to designs of the related art.

Figure 8A:
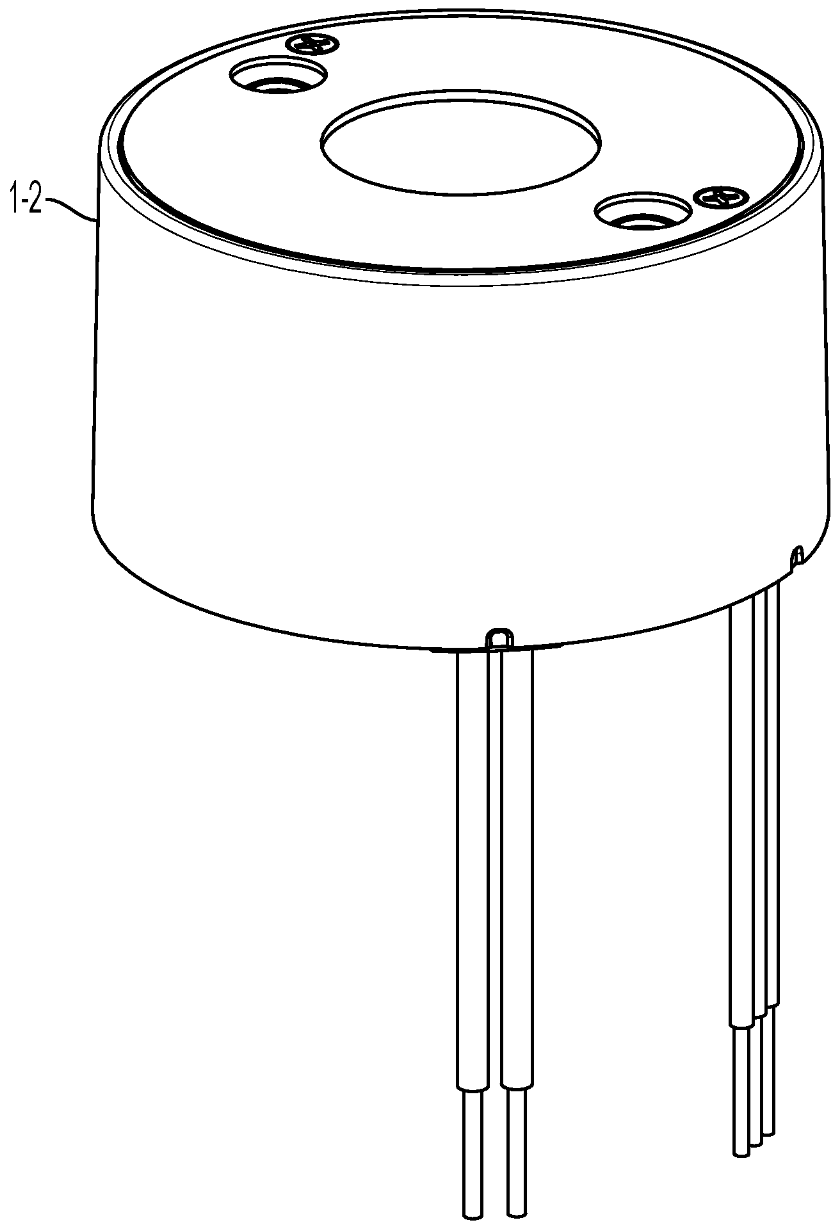
FIG. 8A illustrates a perspective view of a lighting system, according to some embodiments of the present disclosure.
Figure 8B:
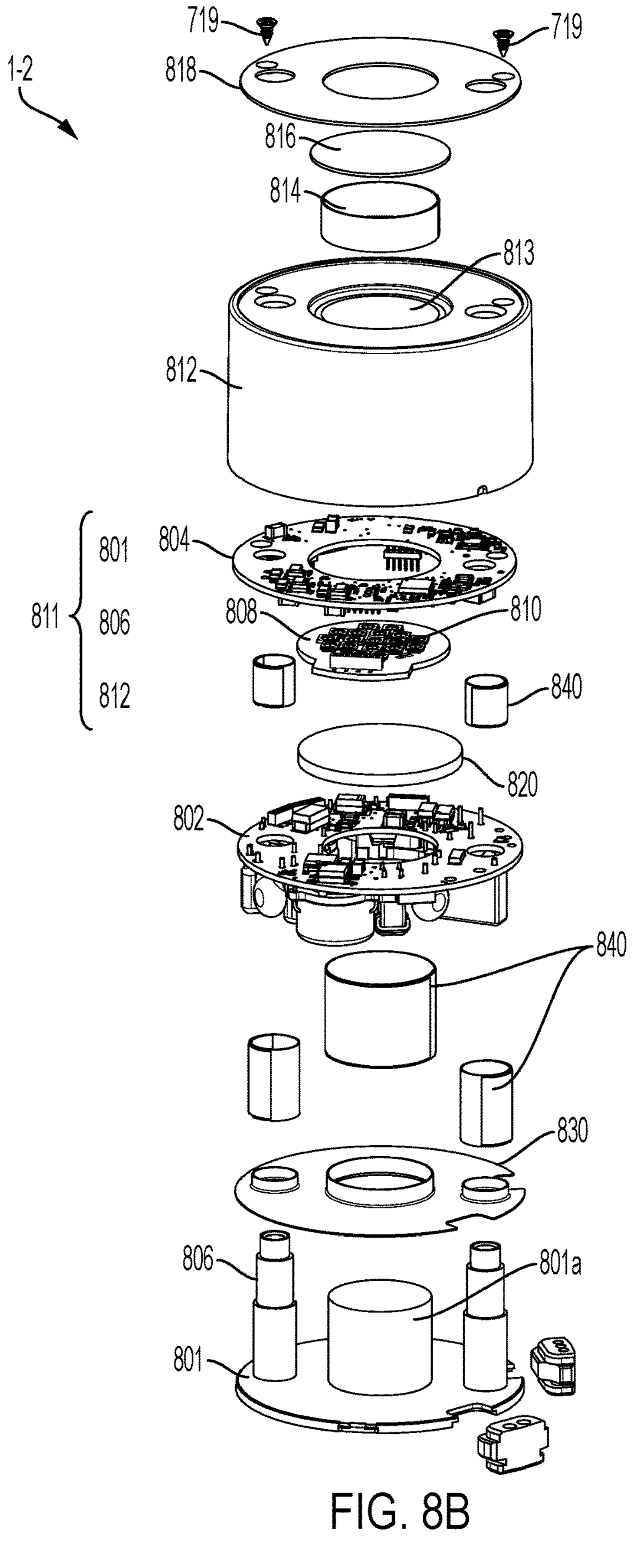
FIG. 8B illustrates an exploded perspective view of the lighting system, according to some embodiments of the present disclosure.
Figure 8C:
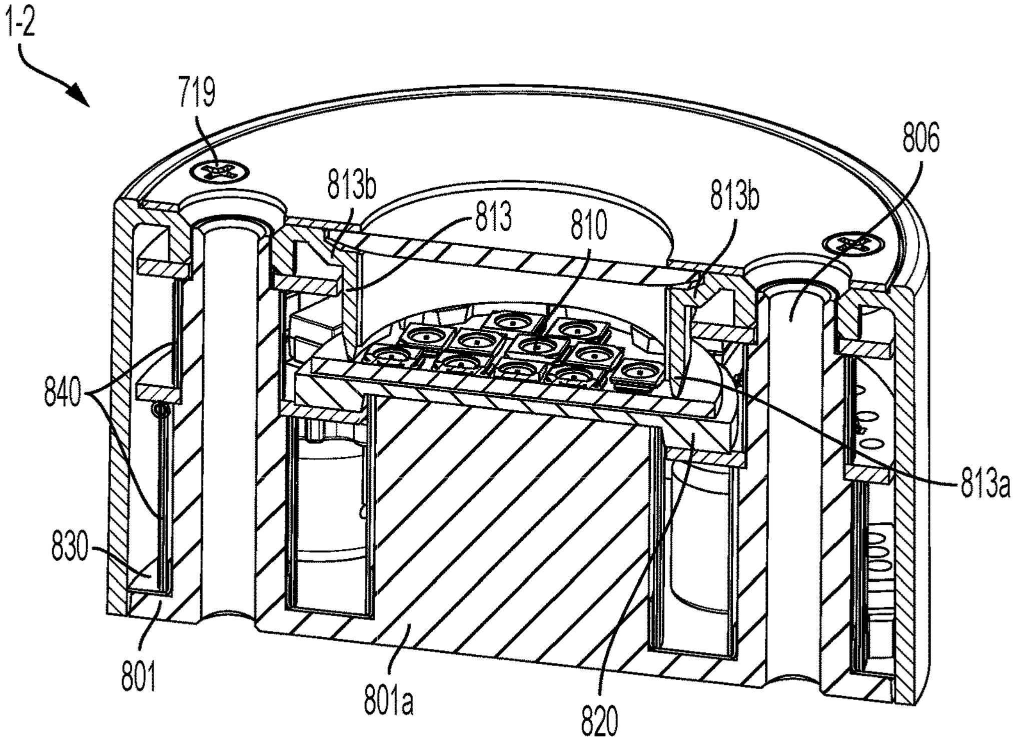
FIG. 8C illustrates a cutaway perspective view of the lighting system, according to some embodiments of the present disclosure.
Figure 8D:
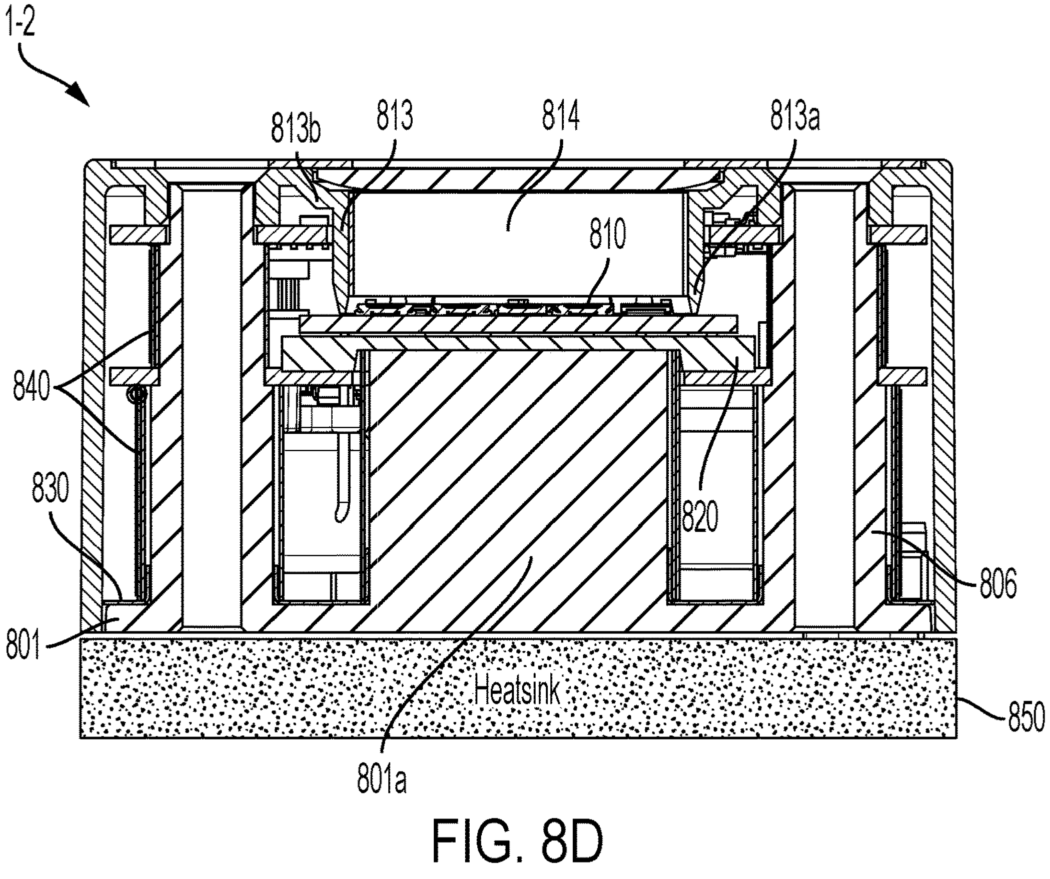
FIG. 8D illustrates a cross-sectional view of the lighting system, according to some embodiments of the present disclosure.
Figure 8E:
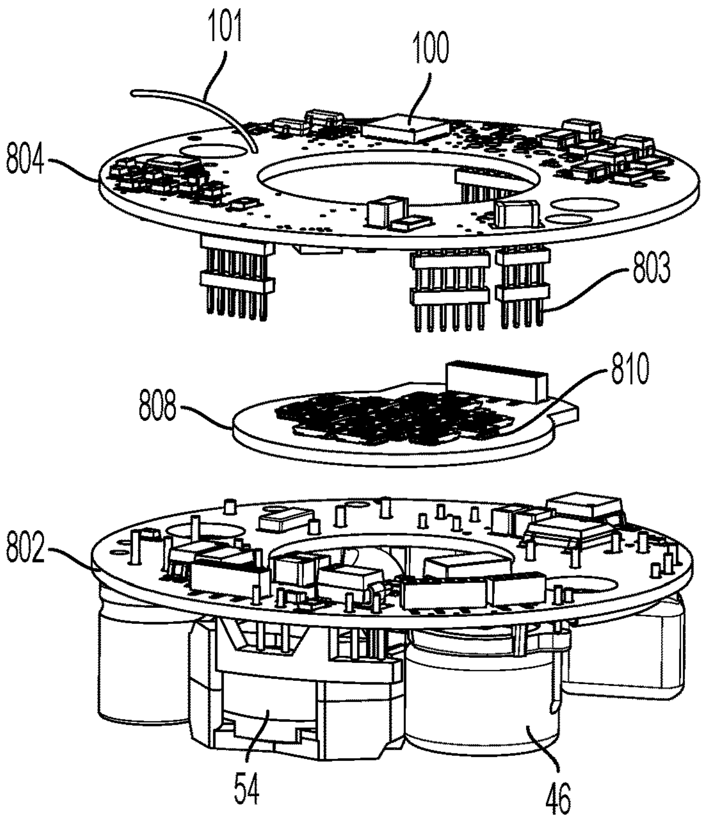
FIGS. 8E and 8F illustrate exploded perspective views of the layers of the lighting system on which the internal electrical components are mounted, according to some embodiments of the present disclosure.
Figure 8F:
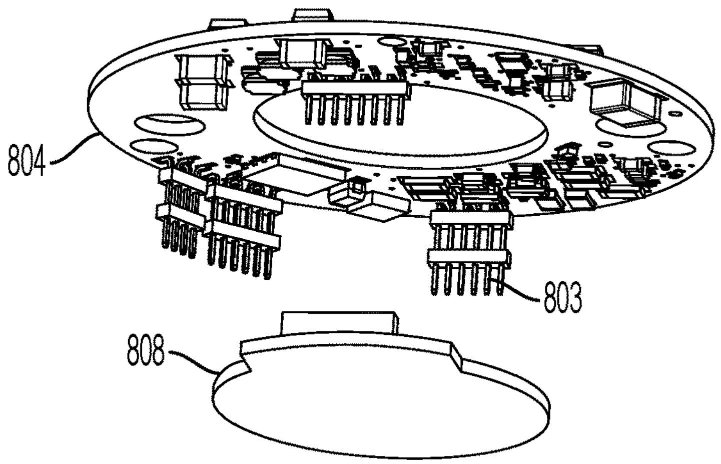
Figure 8G:
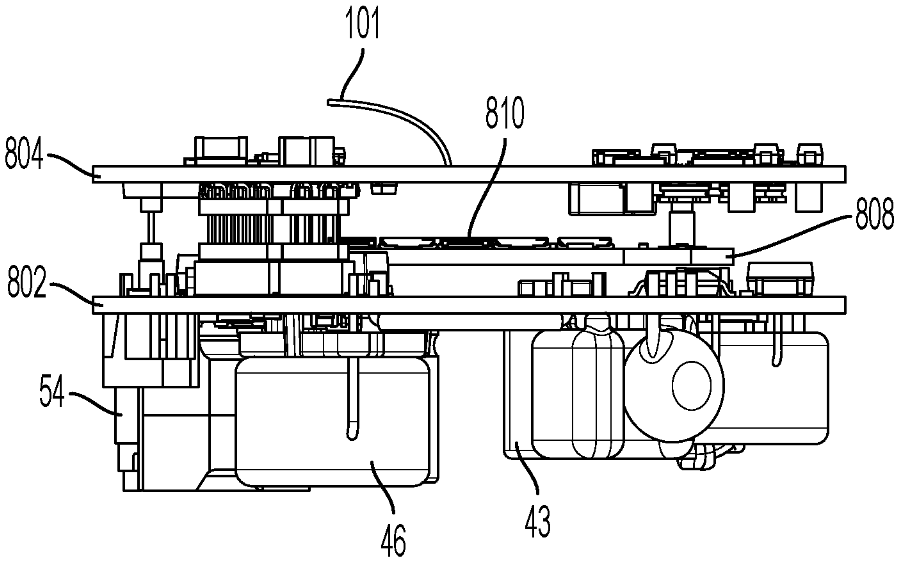
FIG. 8G illustrates a side view of the two layers of the lighting system, according to some embodiments of the present disclosure.

FIG. 8A illustrates a perspective view of the lighting system 1-2, according to some embodiments of the present disclosure. FIG. 8B illustrates an exploded perspective view of the lighting system 1-2, according to some embodiments of the present disclosure. FIG. 8C illustrates a cutaway perspective view of the lighting system 1-2, according to some embodiments of the present disclosure. FIG. 8D illustrates a cross-sectional view of the lighting system 1-2, according to some embodiments of the present disclosure. FIGS. 8E and 8F illustrate exploded perspective views of the layers of the lighting system 1-2 on which the internal electrical components are mounted, according to some embodiments of the present disclosure. FIG. 8G illustrates a side view of the two layers of the lighting system 1-2, according to some embodiments of the present disclosure.

The lighting system 1-2 may have many elements and features that are the same as, or substantially similar to, those of the lighting system 1-1. In the interest of brevity, the following description will mainly focus on differences between the lighting systems 1-1 and 1-2, and descriptions of common or substantially similar elements and features may not be repeated herein.

Referring to FIG. 8A, the lighting system 1-2 according to some embodiments is a tunable AC-input white LED engine having a wide light-emitting surface (LES) and high lumen output, which makes it suitable for general illumination applications. In some examples, the lighting system 1-2 may be a cylindrical light fixture having a diameter of about 50 mm. The flat top may have an aperture (e.g., a round lens) with an LES of about 19 mm. The light system 1-2 may be able to produce a light output of about 1200 lm. In some examples, the lighting system 1-2 may utilize 3-channel de-saturated (Fusion) LEDs to achieve precise blackbody line (BBL) tuning.

Referring to FIG. 8B, the lighting system 1-2 has a 3-layer structure including a first layer 802, a second layer 804 coupled to and vertically offset from the first layer 802 by two or more base posts 806, and a third layer 808 that is vertically offset from and coupled to the second layer 804. The layers 802, 804, and 808 may include PCBs having one or more layers (e.g., metal layers).

In some embodiments, the housing 811 of the lighting system 1-2 includes a heatsink base 801 at the bottom side/backside of the lighting system 1-2, which faces away from the layers 802, 804, and 808, and has a central pedestal (or pillar) structure 801*a* that protrudes from the heatsink base 801 toward the third layer 808. The heatsink base 801 and the pedestal (or pillar) structure 801*a* together form a heatsink for the light source 810 and components of the lighting system 1-2.

The base posts 806 may extend vertically from the heatsink base 801 to the top of the case cover 812 within the interior space of the housing 811. The base posts 806 may not only couple the case cover 812 to the heatsink base 801, but they also support the first and second layers 802 and 804 above the heatsink base 801 via one or more stepped portions at the exterior of the base posts 806. In some examples, the base posts 806 may have a hollow interior allowing a fastener to pass therethrough and couple the lighting system 1-2 to a heatsink mount (e.g., a fixture heatsink) 850, which may be a passive heat exchanger or an active heat exchanger (e.g., including a fan).

In some embodiments, the first and second layers 802 and 804 may be ring-shaped and have openings in theirs centers that allow the pedestal 801*a* to pass therethrough. The first and second layers 802 and 804 may be vertically offset from the heatsink base 801, thus allowing components to be mounted one both sides of each of the first and second layers 802 and 804.

In some embodiments, the integrated multi-layered lighting system 1-2 includes a light source 810 coupled to the third layer 808, which is supported by and is thermally connected to the heatsink pedestal 801*a*. The opening of the second layer 804, which is positioned above the third layer 808, allows for the light produced by the light source 810, which may include a plurality of light emitting diodes (LEDs), to pass through the second layer 804 without obstruction and to illuminate the target environment. The light source 810 may include one or more green LEDs of the green channel 20, one or more blue LEDs of the blue channel 22, and one or more red LEDs of the red channel 24. In some examples, the LEDs 810 are unsaturated LEDs, which serve to provide a more vibrant and consistent color to illuminated objects as compared to saturated LEDs.

The housing 811 also includes a case cover 812 that, together with the heatsink base 801, encompass/encase the components within the lighting system 1-2 and protects them from the elements. At its center, the case cover 812 may have an inner/inward extension portion 813 defining an opening (or a case/housing opening) that can act as a light tunnel directing light produced by the light source 810 to the outside. A reflector (e.g., metal reflector) 814 may be placed inside the case/housing opening to ensure that the light produced by the light source 810 is not absorbed by the interior walls of the case/housing opening, and thus improve (e.g., increase) the light extraction efficiency of the lighting system 1-2. The reflector 814 may rest on or contact the inner surface of the inner extension portion 813. The reflector 814 may have a cylindrical shape (as shown in FIG. 8B-8D) or may be inwardly tapered. A glass lens 816 may fit within a notched portion 813*b* of the case/housing opening and be held in place above the light source 810 by a hold-down cap (e.g., a ring-shaped hold-down cap) 818 that is fastened (e.g., screwed) to the top of the case cover 812.

As the light source 810 may generate a lot of heat in the tightly confined space of the lighting fixture 1-1, thermal management is an important consideration. To improve the dissipation of heat generated by the light source 810, the third layer 808 that has the light source 810 mounted thereto is placed on top of the heatsink pedestal 801*a*, which is thermally and electrically conductive and channels/transfers the light source-generated heat to the heatsink base 801 and the outside (e.g., via the heatsink mount/fixture 850). In some examples, a thermal conductivity pad 820 may fill the gap between the light source 810 and the top surface of the conductive (and grounded) pedestal 801*a*. The thicker the thermal pad 820, the lower the resistance between the back of the light source (e.g., the LEDs) 810 and the pedestal 801*a*. In some examples, the thermal padding 820 may be about 2 mm thick, which is significantly thicker than the micron separation between the traces and the metal plate of the solution of the embodiments of FIGS. 7A-7H (substrate solution). Therefore, any capacitance resulting from the presence of the thermal pad 820, which is electrically insulative, between conductive pedestal 801*a* and the metal backing of the light source (e.g., the LEDs) 810 is very small (as compared to the capacitance resulting from the metal backing and micron-thick insulation in the first layer 702), and does not affect the operation of the circuitry of the lighting system 1-2. In other words, the noise generated by the system 1-2 (e.g., the primary switch 53) does not have a meaningful path to safety ground. As such, the design of the embodiments of FIGS. 8A-8G does not need the decoupling capacitor 720 to decouple the safety ground of the heatsink structure and driver ground, which was discussed above with respect to FIGS. 7A-7H.

In some embodiments, two or more of the heatsink base 801, the pedestal structure 801*b*, and the one or more posts 806 are monolithically formed out of a same material. For example, the heatsink base 801 and pedestal structure 801*a* may be cast out of the same material and may form a single integrated/monolithic heatsink structure; however, embodiments of the present disclosure are not limited thereto. For example, one or more of the heatsink base 801, the pedestal structure 801*a*, and the one or more posts 806 may be separately formed (e.g., separately cast) and fixed together (e.g., via welding or a fastening mechanism). In some examples, the heatsink 801 and 801*a* may be made of copper, aluminum, or any other suitable material that is sufficiently electrically and thermally conductive.

The metal heatsink base 801 may extend continuously or substantially continuously across the bottom surface of the lighting system 1-2, and the pedestal 801*a* may have a sufficient diameter to maintain the temperature of the light source 810 at a desired temperature range of, for example, about 30° C. to about 40° C. Without the heat sink properties of the metal core layer 106, the LEDs 810 may operate at significantly higher temperatures (e.g., about 20° C. to 30° C. higher), which could lead to a change in the LED characteristics and to an undesirable change in the color and intensity of the light output of the lighting system 1-2. The heatsink structure 801 and 801*a* may also act as the safety ground of the lighting system 1-2.

In some examples, the base post 806 may be cast out of the same material as the heatsink structure 801 and 801*a* and may form a monolithic structure therewith. However, embodiments of the present disclosure are not limited thereto, and for example, the base posts 806 may be separately formed and then fastened to the heatsink structure 801 and 801*a*.

In addition to acting as a heatsink, the pedestal 801*a* positions the light source 810 closer to the round aperture 816, which allows the lighting system 1-2 to improve light extraction efficiency and to achieve a target 100 lumens/watt out of the small aperture. The pedestal structure 801*a* may slightly increase thermal resistance from the back of the light source 810 to the back plate. Therefore, in some examples, to compensate for this added thermal resistance and to maximize heat transfer from the light source 810 to the back surface of the heatsink base 801, copper may be used as the casting material, as it has higher thermal conductivity than aluminum.

In some embodiments, one of more components of at least one of the power supply 50 and one or more components of the light driver 30 are mounted on at least an underside of the first layer 802 facing the heatsink base 801. Further, one of more components of at least one of the power supply 50 or the light driver 30 are mounted on a top side of the first layer 802 facing away from the heatsink base 801. Similarly, one of more components of at least one of the power supply 50 or the light driver 30 are mounted on an underside of the second layer 804 facing the first layer 802, one of more components of at least one of the power supply 50 or the light driver 30 are mounted on a top side of the second layer 804 facing away from the first layer 802.

In some examples, the components mounted to the first layer 802 may be the same or substantially the same as those mounted to the second layer 704, and the components mounted to the second layer 804 may be the same or substantially the same as those mounted to the first layer 702, with the exception of the light source 810. However, because of the additional real estate resulting from being able to mount components to both sides of the second layer 804, in some examples, the primary switch 53 as well as other small components may be mounted to the second layer 804. This may be illustrated more clearly in FIGS. 8E-8G. In some examples, the antenna 101 may be mounted on the same layer as the channel controller 100, that is, the second layer 804, as shown in FIGS. 8E and 8G.

As shown, in some examples, the second components mounted on the first to third layers 802, 804, and 808 may be electrically connected to one another through one or more electrical connectors/links 803.

As the base posts 806 are safety grounded, it is desirable to insulate the posts 806 from the rest of the lighting system circuit. Therefore, in some embodiments, a base insulator 830 is placed above the heatsink base 801 and one or more rolled insulators 840 may be positioned around different sections of the vertical base posts 806 to insulate the safety-grounded heatsink (801, 801*a*, and 806) from the electrical components of the lighting system 1-2. The base insulator 830 may have openings therethrough to correspond to the pedestal 801*a* and the two base posts 806 and may have circular protrusions that cover the bottom portion of the side surfaces of the pedestal 801*a* and the two base posts 806. The rolled insulators 840 may be secured to the pedestal 801*a* and the two base posts 806 by tape, sonic welding, heat welding, vacuum sealing, or any other suitable mechanism. The base insulator 830 and the rolled insulators 840 may be made of high voltage resistant, high temperature resistant (and, e.g., self-extinguishing), and electrically insulative material. The material may also be thermally conductive to improve heat dissipation through the heatsink (801, 801*a*, and 806). However, embodiments of the present disclosure are not limited thereto. For example, the housing 811 may include insulated post covers (e.g., plastic post covers) that cover and insulate the base posts 806 and pedestal 801*a*, and prevent other electrical components from making physical and electrical contact with these elements.

In some examples, the first and second layers 802 and 804 may have a ring shape. Further, the first and second layers 802 and 804 may have the same or substantially the same diameter; however, embodiments of the present disclosure are not limited thereto, and the first and second layers 802 and 804 may have any suitable shape and size to fit within an existing wall fixture. For example, as shown in FIGS. 8B-G, the first and second layers 802 and 804 overlap one another in a plan view. Further, the third layer 808 partially overlaps the first and second layers 802 and 804 in a plan view (e.g., outer edges of the third layer 808 may overlap inner edges of the first and second layers 802 and 804 in a plan view).

Figure 9A:
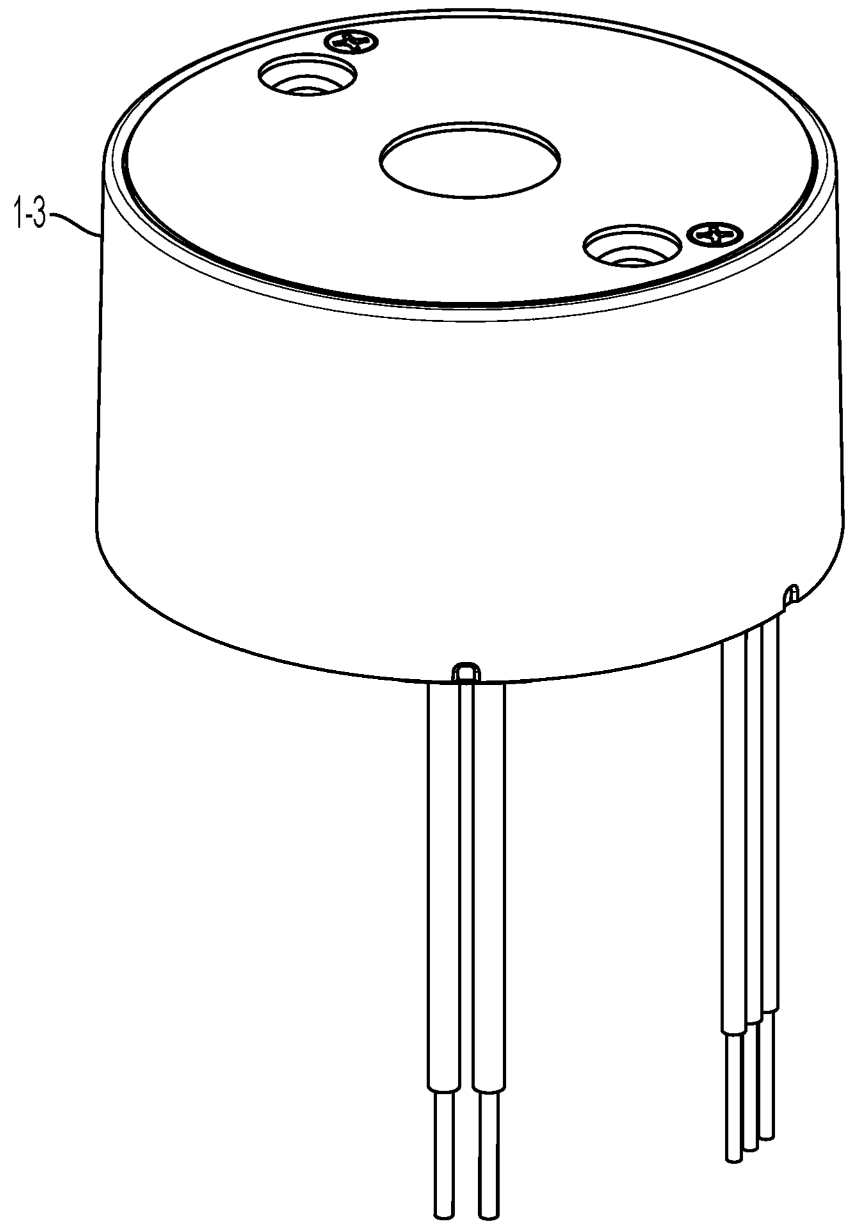
FIG. 9A illustrates a perspective view of a lighting system, according to some embodiments of the present disclosure.
Figure 9B:
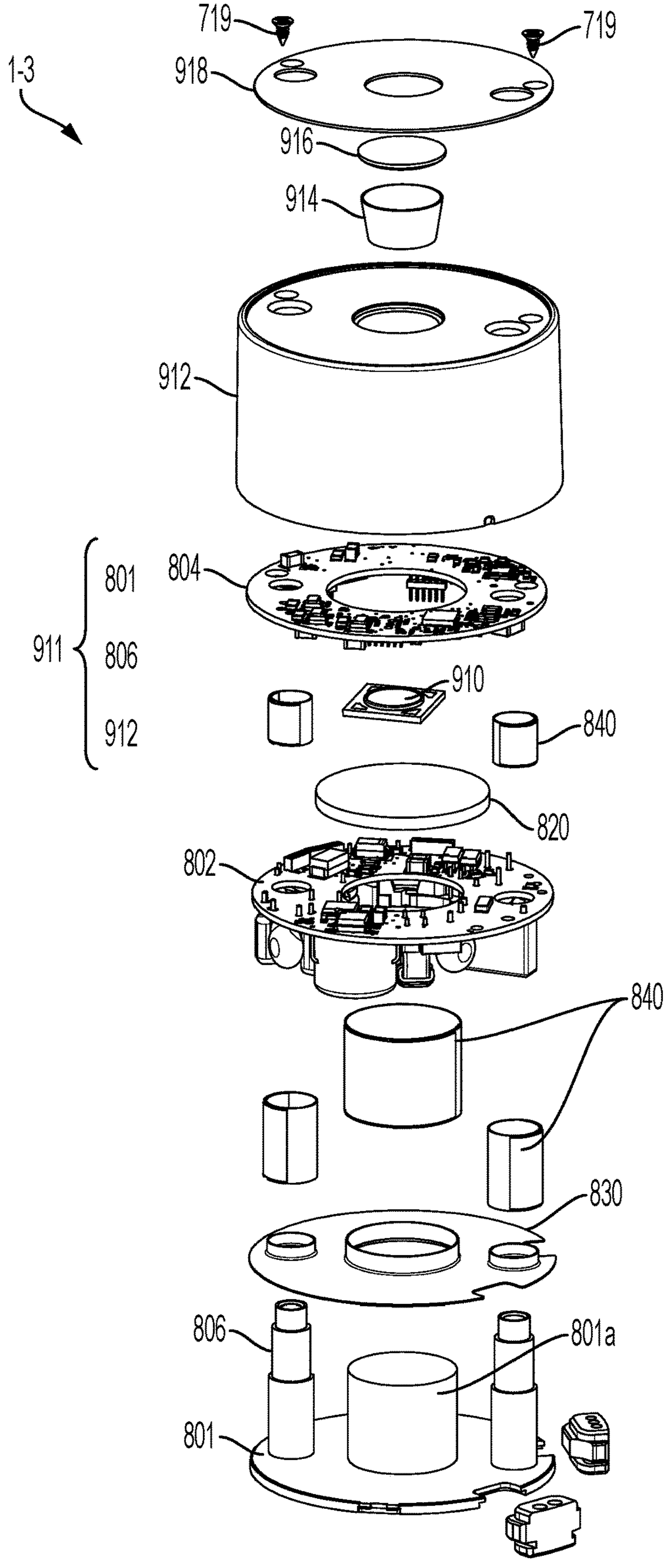
FIG. 9B illustrates an exploded perspective view of the lighting system, according to some embodiments of the present disclosure.
Figure 9C:
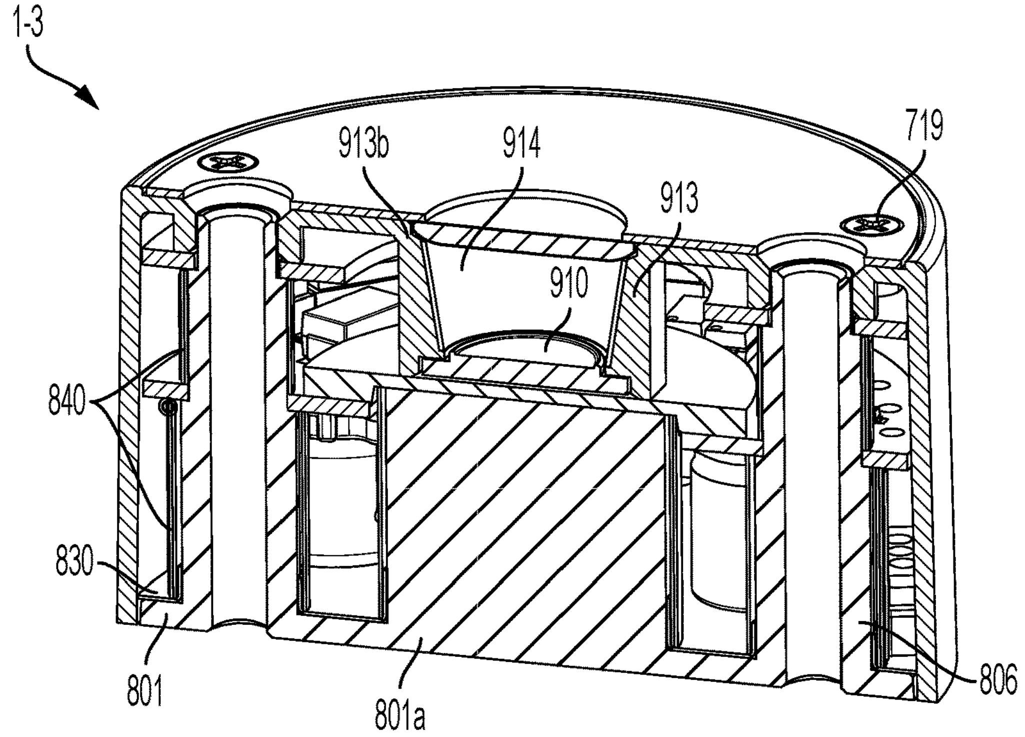
FIG. 9C illustrates a cutaway perspective view of the lighting system, according to some embodiments of the present disclosure.
Figure 9D:
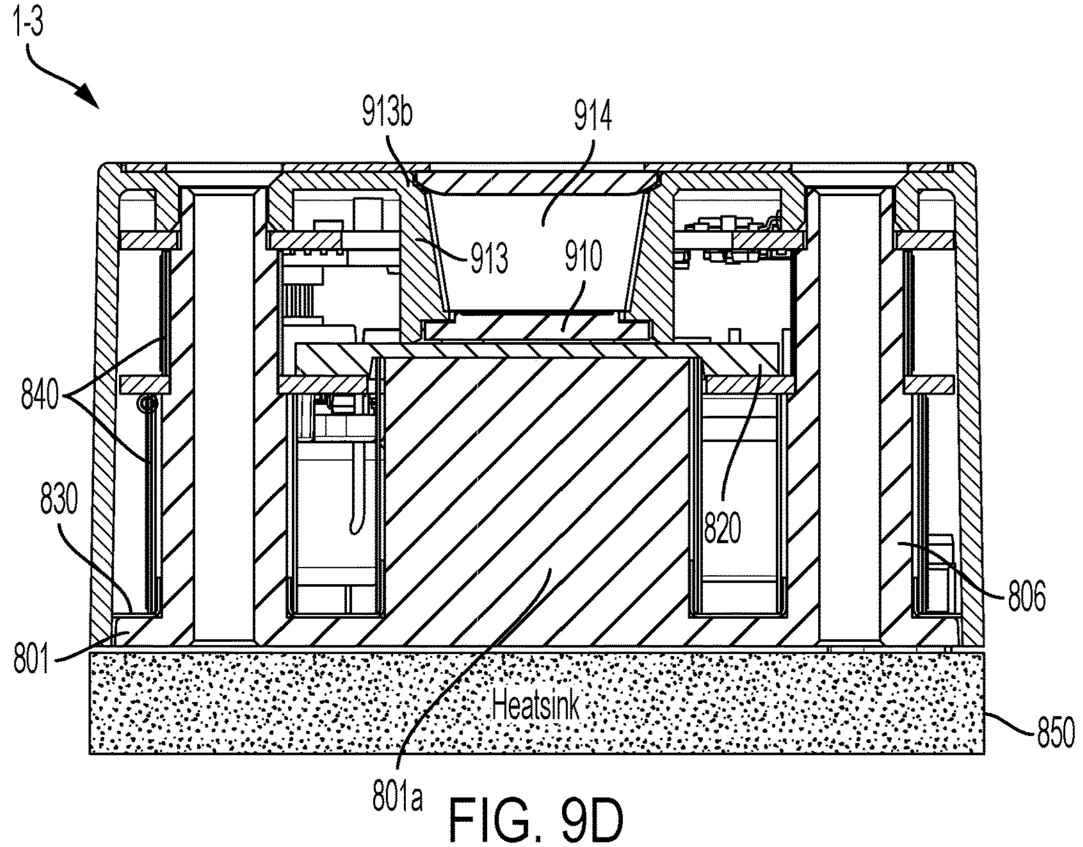
FIG. 9D illustrates a cross-sectional view of the lighting system, according to some embodiments of the present disclosure.
Figure 9E:
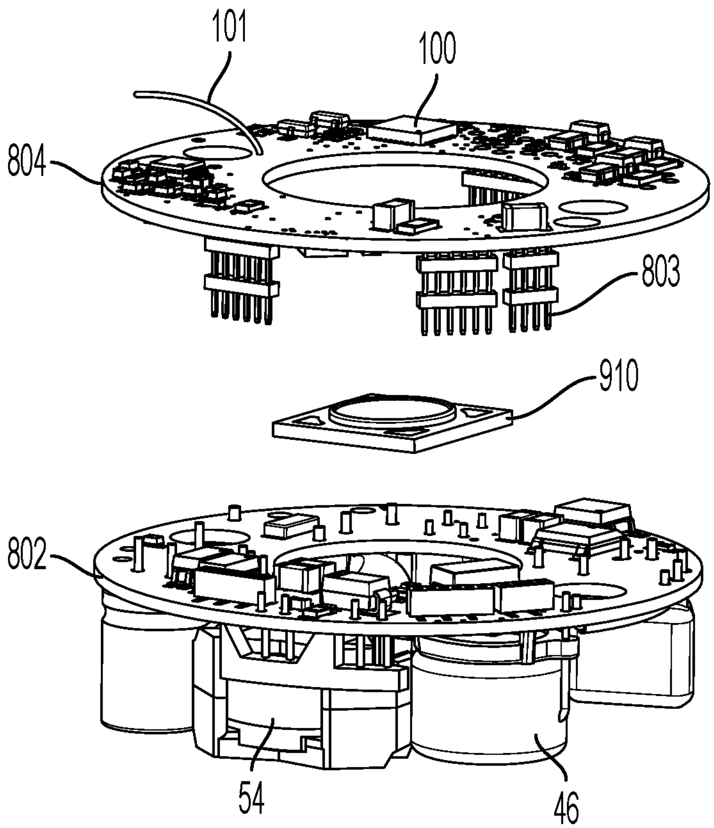
FIGS. 9E and 9F illustrate an exploded perspective view of the layers of the lighting system on which the internal electrical components are mounted to, according to some embodiments of the present disclosure.
Figure 9F:
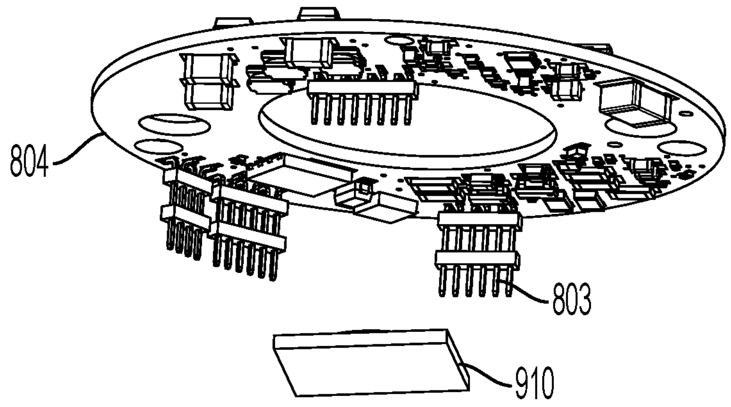
Figure 9G:
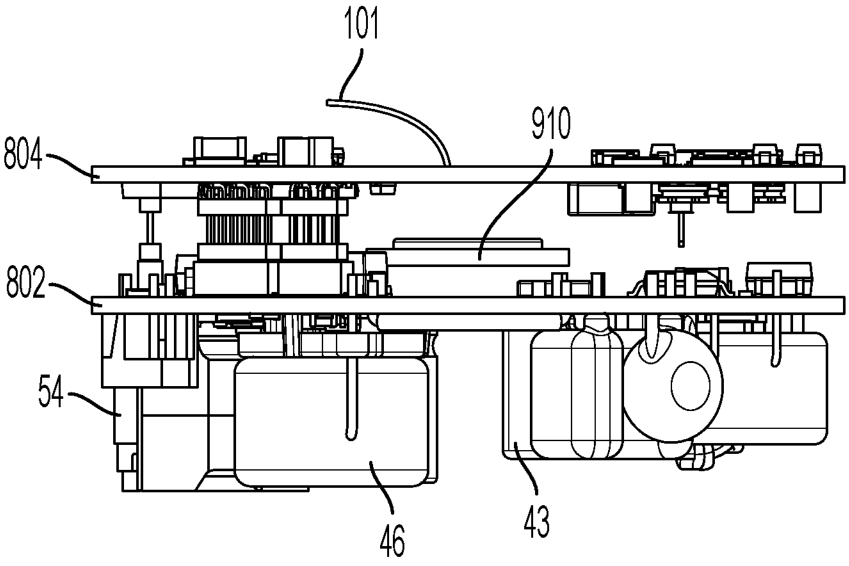
FIG. 9G illustrates a partial side view of the layers of the lighting system, according to some embodiments of the present disclosure.

FIG. 9A illustrates a perspective view of the lighting system 1-3, according to some embodiments of the present disclosure. FIG. 9B illustrates an exploded perspective view of the lighting system 1-3, according to some embodiments of the present disclosure. FIG. 9C illustrates a cutaway perspective view of the lighting system 1-3, according to some embodiments of the present disclosure. FIG. 9D illustrates a cross-sectional view of the lighting system 1-3, according to some embodiments of the present disclosure. FIGS. 9E and 9F illustrate an exploded perspective view of the layers of the lighting system 1-3 on which the internal electrical components are mounted to, according to some embodiments of the present disclosure. FIG. 9G illustrates a partial side view of the layers of the lighting system 1-3, according to some embodiments of the present disclosure.

The lighting system 1-3 may have many elements and features that are the same as, or substantially similar to, those of the lighting system 1-2. In the interest of brevity, the description of lighting system 1-3 will mainly focus on differences between the lighting systems 1-2 and 1-3, and descriptions of common or substantially similar elements and features may not be repeated.

Referring to FIG. 9A, the lighting system 1-3 is a static white AC-input LED engine having a narrow light-emitting surface (LES) and high lumen output. In some examples, the lighting system 1-2 may be a cylindrical light fixture having a diameter of about 50 mm. The flat top may have an aperture (e.g., a round lens) with an LES of about 9 mm or 12 mm. The light system 1-3 may be able to produce a light output of about 1500 lm. In some examples, the lighting system 1-3 may utilize a single CCT COB to achieve narrower LES and higher lumen output. It may provide high lumens per watt (LPW) but with no white tuning.

The internal structure of the lighting system 1-3 may be substantially the same as that of the lighting system 1-2 with some exceptions. For example, instead of using a third layer 808 with surface mounted LEDs 810, the lighting system 103 utilizes a COB (e.g., a single CCT COB) 910, which is supported by the pedestal 801*a*. A thermal gap pad 820 may also fill the gap between the pedestal 801*a* and the COB 910. One or more of the first and second layers 802 and 804 may have wired connections to the COB 910.

In some embodiments, the case cover 912 of the housing 911 may have an inner/inward extension portion 913 that is inwardly tapered and serves to center and secure COB 910. The reflector 914 may conform to the shape of the inner/inward extension portion 913 and may be held in place by the lens (e.g., a glass lens) 916, which may fit within the a peripheral notch (or stepped portion) 913*b* of the case cover 912. The lens 916 may be held in place above the COB 910 by a cap (e.g., a ring-shaped hold-down cap) 918 that is configured to be fixedly attached to (e.g., fastened or screwed to) the top of the case cover 912, for example, via one or more screws 719.

The design of the lighting system 1-3 allows for the COB 910 to be swapped out with any single color array, full-color array, or any other suitable LED array. This change may be accomplished by using the same light engine and simply making suitable modifications to the channel controller firmware. This adds significant versatility to the design of the lighting system 1-3.

Accordingly, as described above, the multi-tiered design of the lighting system 1-2/1-3 provides additional surface area to mount the various components of the light driver 30 in the vertical direction, which allows the lighting system 1-2/1-3 to have a more compact design with a smaller footprint, as compared to designs of the related art.

Figure 10:
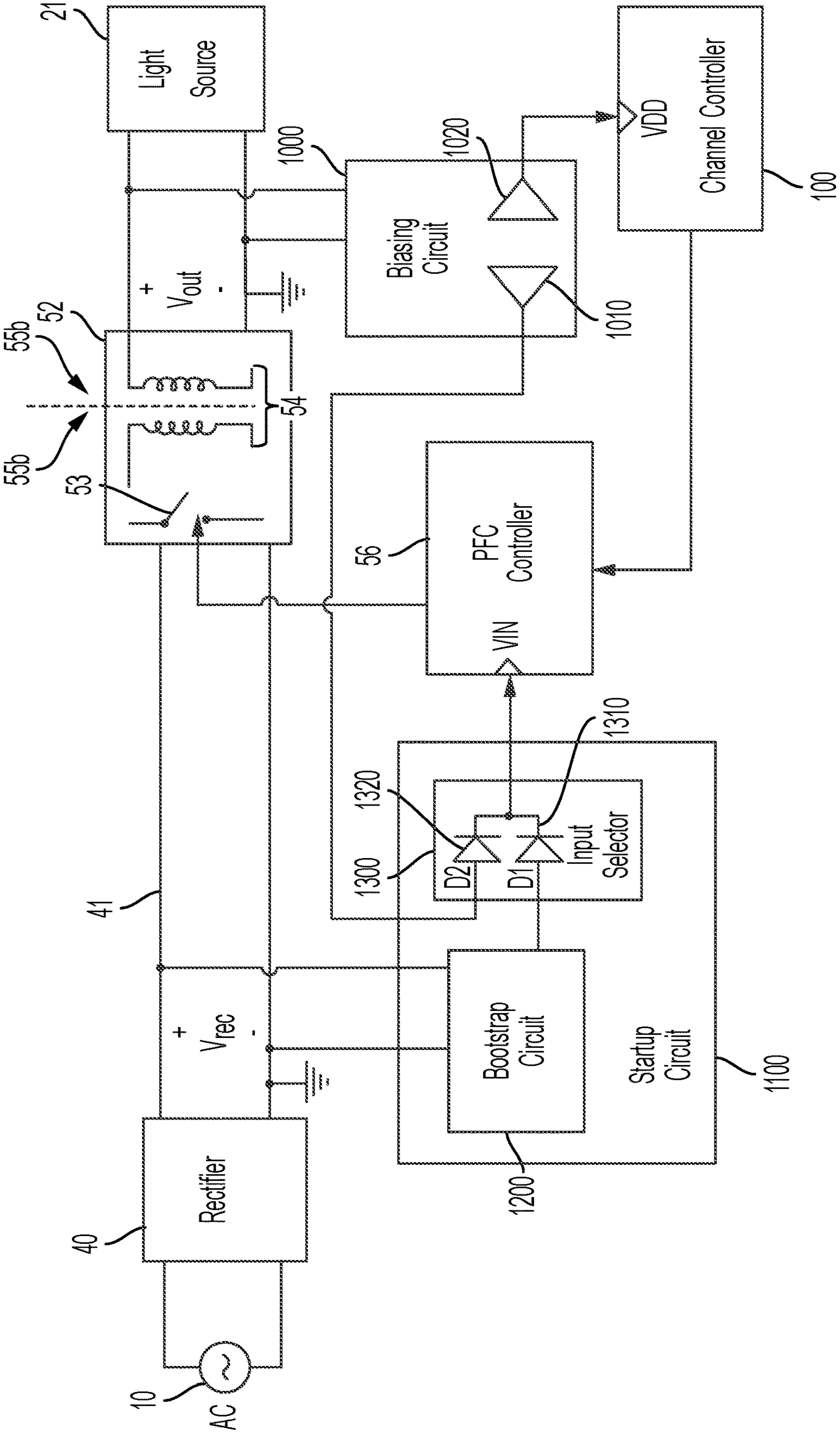
FIG. 10 illustrates a schematic diagram of the lighting system including a startup circuit, according to some embodiments of the present disclosure.

FIG. 10 illustrates a schematic diagram of the lighting system 1 including a startup circuit 1000, according to some embodiments of the present disclosure.

In some examples, the lighting system 1 includes a biasing circuit 1000 configured to regulate (e.g., down regulate) the output voltage Vout of the converter 52 to produce one or more biasing voltages, which are generally used to power the various components of the lighting system 1, such as the primary controller (e.g., PFC controller) 56, the channel controller 100, etc. For example, the biasing circuit 1000 may include a first bias regulator 1010 that is configured to generate a first regulated bias voltage (e.g., about 5 V) based on the output voltage Vout of the converter 52 to power the PFC controller 56, and may include a second bias regulator 1020 that is configured to generate a second regulated bias voltage (e.g., about 5 V) based on the output voltage Vout to power the channel controller 100.

According to some embodiments, the lighting system 1 includes a startup circuit 1100 that enable fast turn on times of the system 1 and the light source 21 by quickly routing the rectified input voltage Vrec generated by the rectifier 40 to the PFC controller 56 as soon as an AC signal is available at the input of the lighting system 1 during initial turn on. The PFC controller 56, in turn, activates the primary switch 53, which allows the converter 52 to generate the desired output voltage Vout. Once the output voltage Vout is at a sufficiently high voltage that the bias voltages generated by the biasing circuit 1000 can stably power the corresponding components (such as the primary controller 56 and the channel controller 100), the startup circuit 1100 decouples the rectified input voltage Vrec from the input of the PFC controller 56 to reduce (e.g., substantially reduce) power dissipation by the startup circuit 1100 and allows the primary controller 56 to be powered by the biasing circuit 1000 based on the output voltage Vout.

Thus, the startup circuit 1100 is configured to power the primary controller 56 based on the rectified input voltage Vrec in response to the output voltage Vout being below a threshold, and to power the primary controller based on the output voltage Vout in response to the output voltage being greater than or equal to the threshold.

According to some embodiments, the startup circuit 1100 includes a bootstrap circuit 1200 configured to generate a first power signal based on the rectified input voltage Vrec and the output voltage Vout of the converter 52, and an input selector 1300 configured to receive the first power signal from the bootsrap circuit 1200 and a second power signal (e.g., a bias signal) from the biasing circuit 1000, and to apply one of the first and second power signals (e.g., one of the first and second power voltages) to a power input terminal VIN of the primary controller 52, which supplies electrical power to the internal circuitry of the primary controller 52 and powers its internal operations.

In some embodiments, the input selector 1300 includes a first diode 1310 (D1) and a second diode 1320 (D2) with inputs respectively connected to output of the bootstrap circuit 1200 and the biasing circuit 1000, and with outputs that are both tied together at the power input terminal VIN of the primary controller 52. The first diode 1310 (D1) may include an anode terminal configured to receive the first power signal from the bootstrap circuit 1200 and a cathode terminal coupled to the power input terminal VIN of the primary controller 52. The second diode 1320 (D2) may include an anode terminal configured to receive the second power signal from the biasing circuit 1000 and a cathode terminal coupled to the power input terminal VIN of the primary controller 52. Thus, the input selector 1300 applies whichever one of the first power signal and the second power signal that has a higher voltage to the primary controller 52.

While the input selector 1300 of FIG. 10 utilizes two diodes, embodiments of the present disclosure are not limited thereto, and any suitable circuitry may be utilized to achieve the stated function of the input selector 1300.

Figure 11:
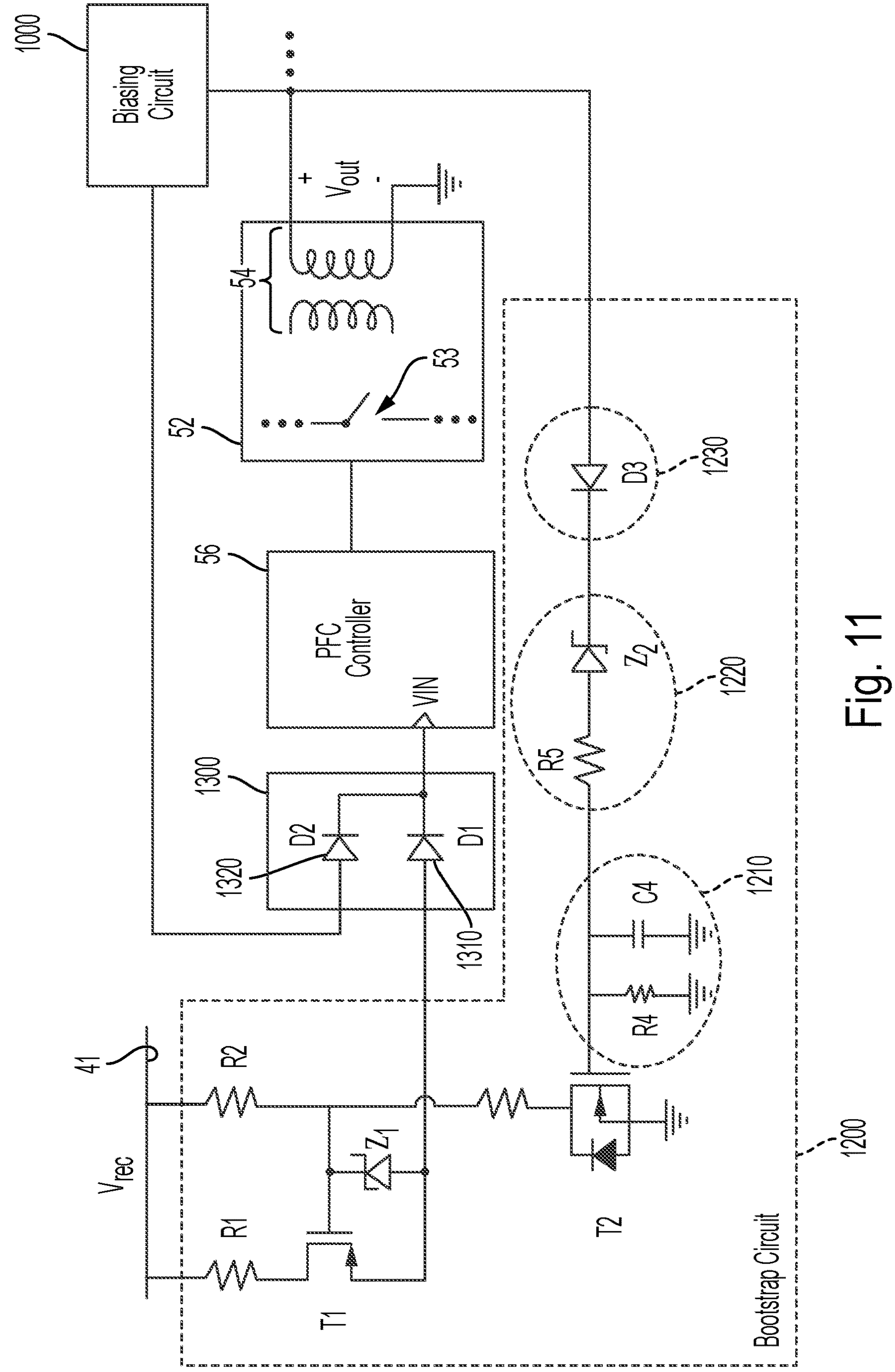
FIG. 11 illustrates a schematic diagram of the startup circuit of the lighting system 1, according to some embodiments of the present disclosure.

FIG. 11 illustrates a schematic diagram of the startup circuit 1100 of the lighting system 1, according to some embodiments of the present disclosure.

In some embodiments, the bootstarp circuit 1200 includes a first transistor T1 (e.g., an NMOS transistor) coupled between an input line 41 for supplying the rectified input voltage Vrec and the input selector 1300 (e.g., the first diode 1310 (D1)). The first transistor T1 has a first gate electrode and is configured to selectively electrically couple or electrically decouple the input line 41 and the input selector 1300 based on a gate voltage of the first gate electrode. The first transistor T1 is configured to activate (e.g., turn on) to electrically couple the input line 41 to the input selector 1300 in response to the first gate electrode being at a first voltage (e.g., a high voltage close to Vrec), and to deactivate (e.g., turn off) to electrically decouple the input line 41 from the input selector 1300 in response to the first gate electrode being at a second voltage (e.g., a low voltage close to reference ground).

The first transistor T1 may receive the rectified input voltage Vrec at a first electrode (e.g., a drain electrode) through a first resistor R1 and is connected to the power input terminal VIN of the primary controller 56 through a second electrode (e.g., a source electrode). The gate of the first transistor T1 is pulled up to the rectifier voltage Vrec though a second resistor (e.g., a pull-up resistor) R2 and may be pulled down to or close to reference ground via a second transistor T2 (e.g., an NMOS transistor) and a third resistor R3, when the second transistor T2 is activated. That is, the second resistor R2 is configured to pull up the first gate electrode to the first voltage to activate the first transistor T1 in response to the second transistor being deactivated.

A first zener diode Z1 may also be connected between the gate of the first transistor T1 and ground to ensure that the voltage at this gate does not exceed an acceptable limit (which could otherwise damage the first transistor T1).

The second transistor T2 is coupled between the first gate electrode and the ground reference, and has a second gate electrode that is coupled to the output of the converter 52 and is configured to selectively electrically couple or electrically decouple the first gate electrode of the first transistor T1 and the reference ground based on the output voltage Vout. The first transistor T2 is configured to activate (e.g., turn on) in response to the output voltage Vout being greater than or equal to a threshold (e.g., about 2.5 V), and to deactivate in response to the output voltage Vout being less than the threshold.

According to some embodiments, the second gate electrode of the second transistor T2 is also connected to a timer circuit 1210, which controls how quickly the second transistor T2 may be activated and deactivated. The timer circuit 1210 may do so by low-pass filtering the output voltage Vout of the converter 52. In some embodiments, the timer circuit 1210 is an RC filter including a parallel-connected fourth resistor R4 and a capacitor C4, which are coupled between the gate of the second transistor T2 and driver ground.

When the output voltage Vout of the converter 52 is low (e.g., is substantially zero), the second transistor T2 is deactivated (e.g., turned off), and the second resistor R2 is allowed to pull up the gate voltage of the first transistor T1 to the rectified input voltage Vrec (or close to it), which immediately activates the first transistor T1 and thus applies the rectified input voltage Vrec (minus the voltage drop across the first transistor T1) to the input of the primary controller 56 via the first diode 1310 (D1). This may turn on the primary controller 56 before other active components of the lighting system 1, which allows the converter to properly control the operation of the converter 52 to produce the desired output voltage Vout. In the related art, the primary controller 56 may be powered by the channel controller 100 that may take some time to turn on, which may be longer than that of the lighting system 1 due to the operation of the startup circuit 1100.

When the output voltage Vout of the converter 52 is sufficiently high, the second transistor T2 is activated (e.g., turned on), which pulls down the gate voltage of the first transistor T1 thus turning it off and cutting off the input of the PFC controller 56 from the rectified voltage Vrec. This also prevents the drain/waste of power by the first resistor R1. However, the timer circuit 1210 ensures that the disconnection from the rectified voltage occurs only after the biasing circuit 1000 is sufficiently charged to be able to stably power the primary controller 56. In other words, the startup circuit 1100 may power the primary controller 56 via the rectified voltage Vrec until the output of the converter 52 is sufficiently powered up such that the biasing circuit 1000 can stably power the primary controller 56. Here, the startup circuit 1100 has direct access to the output of the converter 52 since the lighting system 1 utilizes a non-isolated design, where the primary and secondary sides 55*a* and 55*b* of the transformer 54 of the converter 52 share a common reference ground.

In the related art, the deactivation of the startup circuit may be prompted by the bias voltage of a bias winding. However, the voltage of the bias winding may not be proportionally dependent on the output voltage Vout and may also be based on the duty cycle of the primary switch 53, which may be influenced by the load and the input voltage 10. Therefore, the relationship between the bias voltage and output voltage Vout is not necessarily linear and may be variable. As such, conditions may occur where, for example, the bias windings are peak charged (perhaps because there is not much load on the windings, e.g., a few mA) even though the converter is not fully on. This may cause the startup circuitry from disconnecting the rectified voltage to the input of the primary controller 56 at a time when the bias windings cannot yet deliver enough power to keep the primary controller 56 on. That in turn may cause the primary controller 56 to turn off, which may turn off the converter 52, thus disrupting the startup or power on sequence of the light driver.

In contrast, the output of the converter 52 may not be peak-charged as it has a meaningful amount of load on it (as all the buck regulators 84 of the various channels run off of Vout, so does the bias winding of the channel controller 100) and there is also a large output capacitance Cout connected to the output. By using the output voltage Vout as the control trigger for the second transistor T2, according to some embodiments, the startup circuit 1100 may ensure that the lighting system 1 is actually on, and not just peak charging a bit to give the false impression of being continuously on (e.g., by continuously switching).

In some embodiments, the timer circuit 1210 controls the hold-off time of the second transistor T2, which ensures that the second transistor T2 is on or off for a set amount of time before the startup circuit 1100 can restart. For example, a condition may occur when the output voltage Vout is powered up completely, but the voltage of the bias regulator 1010 of the primary controller 56 is not where it needs to be (e.g., is too low). Without the timer circuit 1210, this may cause the second transistor T2 to turn on prematurely, thus turning off the first transistor T1, and preventing the rectified input voltage Vrec from reaching the input of the primary controller 56. At this point, the primary controller 56 may turn off (because the second power voltage generated by the biasing circuit 1000 has not yet reached the necessary threshold to keep primary controller 56 on). However, the hold-off period of the timer circuit 1210 may be set so that the above-described scenario does not occur, and the second transistor T2 is prevented from being prematurely turned on. The holdoff time of the timer circuit 1210 may also ensure that the second transistor T2 does not accidentally turn on as a result of any switching noise that may exist on the output line of the converter 52, or as a result of a bouncing light switch. For example, when a light switch is turned on, it may not make a perfect contact immediately and instead may bounce, for example, every 50 ms for a period of about 200 ms. Without the timer circuit 1210, this may lead to large currents passing through the primary switch 53 as it repeatedly tries to charge the output voltage Vout. The hold-off time of the timer circuit 1210, when set appropriately, may eliminate this problem.

Because the output voltage Vout may be too high to deliver to the gate of the second transistor T2, in some embodiments, the startup circuit 1100 includes a voltage-drop circuit 1220 coupled between the output of the converter 52 and the second gate electrode of the second transistor T2, which is configured to generate a reduced output voltage based on the output voltage Vout, and to apply the reduced output voltage to the second gate electrode. In some examples, the voltage-drop circuit 1220 includes a second zener diode Z2 having an anode electrode coupled to the second gate electrode of the second transistor T2, and a cathode electrode coupled to the output of the converter 53. The second zener diode Z2 may be in the signal path between the converter output and the second gate electrode of the second transistor T2, which allows the output voltage Vout to be dropped down to an acceptable level (e.g., dropping it by 5.6 V) before routing it to the second gate electrode of the second transistor T2. The voltage-drop circuit 1220 may further include a fifth resistor R5 in the signal path from the converter output to the second gate electrode. Thus, the dropped voltage of the second zener diode Z2 may be further divided down by the resistive voltage divider made of the fifth and fourth resistors R5 and R4.

According to some embodiments, the startup circuit 1100 further includes an isolation circuit 1230 coupled between the output of the converter 52 and the second gate electrode of the second transistor T2, which is configured to prevent back-charging of the output of the converter 52 from the second gate electrode. The isolation circuit 1230 may include a third diode D3 in the signal path of Vout to the second gate electrode of the second transistor T2, which can isolate the voltage stored at the capacitor C4 and prevent the timer circuit 1210 from back feeding the output voltage Vout when the lighting system 1 is turned off (i.e., no voltage being produced at the converter output, such as when the AC input signal is turned off). Without the isolation circuit 1230, when the lighting system 1 is off, the charge stored in the capacitor C4 may be drained by the plurality of components that are powered by the secondary bias windings of the converter 52, which would significantly reduce the hold-off period of the timer circuit 1210, and adversely affect its operation.

In some examples, the first resistor may be about 6 KΩ, the second resistor may be about 3 MΩ, the third resistor may be a small resistor (e.g., about 0 KΩ), the fourth resistor may be about 330 KΩ, the fifth resistor may be about 500 KΩ, and the capacitance C4 may be about 1 μF.

The lighting system 1 referred to herein with respect to FIGS. 10 and 11 may be any one of lighting systems described above with respect to FIGS. 1-9G, but is not limited thereto and may be any suitable lighting system used to drive a light source.

Therefore, as described above, the lighting system 1, according to some embodiments, includes a fast startup circuit 1100 that provides a low-power method of achieving rapid turn on of the primary controller 56 and thus the lighting system 1, while allowing turn off control using the direct output of the lighting system 1, which may prevent intermittent shut-offs of the primary controller 56 and the lighting system 1.

It will be understood that, although the terms “first”, “second”, “third”, etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

Spatially relative terms, such as “beneath”, “below”, “lower”, “under”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The integrated multi-layered lighting system and/or any other relevant devices or components, such as the channel controller, according to some embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A lighting system comprising:

a converter configured to receive a rectified input voltage and to generate an output voltage based on a control signal;

a primary controller configured to generate the control signal to adjust the output voltage of the converter; and a startup circuit configured to power the primary controller based on the rectified input voltage in response to the output voltage being below a threshold, and to power the primary controller based on the output voltage in response to the output voltage being greater than or equal to the threshold, the startup circuit comprising:

a bootstrap circuit configured to generate a first power signal based on the rectified input voltage;

an input selector configured to receive the first power signal and a second power signal corresponding to the output voltage and to apply one of the first and second power signals to a power input terminal of the primary controller.

2. The lighting system of claim 1, wherein the bootstrap circuit is configured to:

receive the rectified input voltage and the output voltage;

set the first power signal based on the rectified input voltage in response to the output voltage being below the threshold; and set the first power signal based on the output voltage in response to the output voltage being greater than or equal to the threshold.

3. The lighting system of claim 1, wherein the bootstrap circuit comprises:

a first transistor comprising a first gate electrode and configured to selectively electrically couple or decouple an input line and the input selector based on a gate voltage of the first gate electrode, the input line being configured to supply the rectified input voltage;

a second transistor comprising a second gate electrode and configured to selectively electrically couple or decouple the first gate electrode to reference ground based on the output voltage; and a pull-up resistor coupled between the input line and the first gate electrode and configured to activate the first transistor to electrically couple the input line and the input selector in response to the second transistor decoupling the first gate electrode from the reference ground.

4. The lighting system of claim 3, wherein the first transistor is coupled between the input selector and the input line, and is configured to activate to electrically couple the input line to the input selector in response to the first gate electrode being at a first voltage, and to deactivate to electrically decouple the input line from the input selector in response to the first gate electrode being at a second voltage, wherein the second transistor is coupled between the first gate electrode and the reference ground, and the second gate electrode is coupled to an output of the converter, wherein the second transistor is configured to activate in response to the output voltage being greater than or equal to the threshold, and to deactivate in response to the output voltage being less than the threshold, and wherein the pull-up resistor is configured to pull up the first gate electrode to the first voltage to activate the first transistor in response to the second transistor being deactivated.

5. The lighting system of claim 3, wherein the bootstrap circuit further comprises:

a timer circuit coupled between an output of the converter and the second gate electrode of the second transistor and configured to low-pass filter the output voltage.

6. The lighting system of claim 5, wherein the timer circuit comprises an RC filter.

7. The lighting system of claim 3, wherein the bootstrap circuit further comprises:

a voltage-drop circuit coupled between an output of the converter and the second gate electrode of the second transistor and configured to generate a reduced output voltage based on the output voltage, and to apply the reduced output voltage to the second gate electrode.

8. The lighting system of claim 7, wherein the voltage-drop circuit comprises a zener diode having an anode electrode coupled to the second gate electrode of the second transistor, and a cathode electrode coupled to the output of the converter.

9. The lighting system of claim 3, wherein the bootstrap circuit further comprises:

an isolation circuit coupled between an output of the converter and the second gate electrode of the second transistor and configured to prevent back-charging of the output of the converter from the second gate electrode.

10. The lighting system of claim 9, wherein the isolation circuit comprises a diode having an anode electrode coupled to the output of the converter, and a cathode electrode coupled to the second gate electrode of the second transistor.

11. The lighting system of claim 1, wherein the input selector comprises:

a first diode comprising an anode terminal configured to receive the first power signal and a cathode terminal coupled to the power input terminal of the primary controller; and a second diode comprising an anode terminal configured to receive the second power signal and a cathode terminal coupled to the power input terminal of the primary controller.

12. The lighting system of claim 1, further comprising:

a bias regulator coupled between an output of the converter and the primary controller, and configured to generate the second power signal based on the output voltage of the converter to power the primary controller.

13. The lighting system of claim 1, further comprising:

a rectifier configured to receive an AC input signal and to generate the rectified input voltage; and a light source configured to emit light based on the output voltage of the converter.

14. The lighting system of claim 1, wherein the converter is a DC-DC converter, and wherein the primary controller is a power factor correction controller configured to regulate a DC-level current or a DC-level voltage of an output of the converter.

* * * * *